INVENTOR
DANIEL D. HUYETT
BY HIS ATTORNEYS
Howson & Howson

Dec. 11, 1956 D. D. HUYETT 2,773,409

MULTIPLE ASSEMBLING MACHINE FOR ELECTRIC BLASTING INITIATORS

Filed Oct. 2, 1951 22 Sheets-Sheet 2

INVENTOR
DANIEL D. HUYETT
BY HIS ATTORNEYS
Howson & Howson

INVENTOR
DANIEL D. HUYETT
BY HIS ATTORNEYS
Howson & Howson

Dec. 11, 1956 D. D. HUYETT 2,773,409

MULTIPLE ASSEMBLING MACHINE FOR ELECTRIC BLASTING INITIATORS

Filed Oct. 2, 1951 22 Sheets-Sheet 4

INVENTOR
DANIEL D. HUYETT
BY HIS ATTORNEYS
Howson & Howson

Dec. 11, 1956 D. D. HUYETT 2,773,409

MULTIPLE ASSEMBLING MACHINE FOR ELECTRIC BLASTING INITIATORS

Filed Oct. 2, 1951 22 Sheets-Sheet 5

INVENTOR
DANIEL D. HUYETT
BY HIS ATTORNEYS
Howson & Howson

Dec. 11, 1956 D. D. HUYETT 2,773,409

MULTIPLE ASSEMBLING MACHINE FOR ELECTRIC BLASTING INITIATORS

Filed Oct. 2, 1951 22 Sheets-Sheet 6

INVENTOR
DANIEL D. HUYETT
BY HIS ATTORNEYS
Howson & Howson

INVENTOR
DANIEL D. HUYETT
BY HIS ATTORNEYS
Howson & Howson

Dec. 11, 1956 D. D. HUYETT 2,773,409

MULTIPLE ASSEMBLING MACHINE FOR ELECTRIC BLASTING INITIATORS

Filed Oct. 2, 1951 22 Sheets-Sheet 8

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

Dec. 11, 1956 D. D. HUYETT 2,773,409

MULTIPLE ASSEMBLING MACHINE FOR ELECTRIC BLASTING INITIATORS

Filed Oct. 2, 1951 22 Sheets-Sheet 18

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson

INVENTOR
DANIEL D. HUYETT
BY HIS ATTORNEYS
Howson & Howson 2,773,409
Patented Dec. 11, 1956

2,773,409

MULTIPLE ASSEMBLING MACHINE FOR ELECTRIC BLASTING INITIATORS

Daniel D. Huyett, Wilmington, Del., assignor to Atlas Powder Company, Wilmington, Del., a corporation of Delaware Application October 2, 1951, Serial No. 249,298
27 Claims. (Cl. 86—10)

The present invention relates to new and useful improvements in electric blasting initiator assembling machines and more particularly to new and useful improvements in assembling machines adapted to insert a plurality of preformed plugs into cylindrical shells, such as blasting initiators and the like.

The present invention is particularly adapted to insert preformed plug closures into the open ends of a plurality of electric blasting initiators. In the manufacture of blasting initiators the shells are partially filled with explosive material and plugs, which carry an ignition device or match to set off the explosive material, are inserted in the shells. Prior to the present invention, such initiators have usually been assembled individually. This increases considerably the amount of time and labor needed for the manufacture of blasting initiators and makes it impossible to use modern production line methods in the manufacture of such articles.

With the foregoing in mind, the principal object of the present invention is to provide novel apparatus which is operable to insert simultaneously a plurality of preformed plug closures and igniter or match assemblies into a plurality of shells such as electric blasting caps or initiators, and which may be constituted as a single station in a production line for the manufacture of electric blasting caps or initiators and the like.

Another object of the present invention is to provide a novel apparatus for inserting a plurality of plug and electric match assemblies into a plurality of shells charged with explosives, and arranged in close proximity to each other and in which the shells are individually protected and shielded from each other so that the accidental explosion of a single cap is effectively isolated and the probability of explosion of other caps in the apparatus is thereby minmized.

A further object of the present invention is to provide a novel apparatus of the stated character which greatly improves upon prior electric blasting cap assembling methods and machinery.

These and other objects of the present invention and the various features and details of the operation and construction thereof are hereinafter more fully set forth and described with reference to the accompanying drawings in which.

Figure 38:
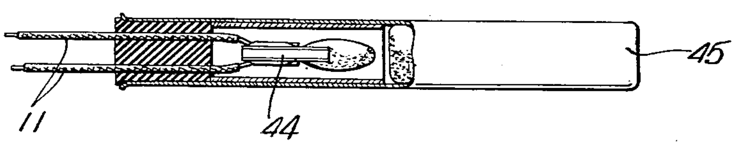
Figures 27, 37:
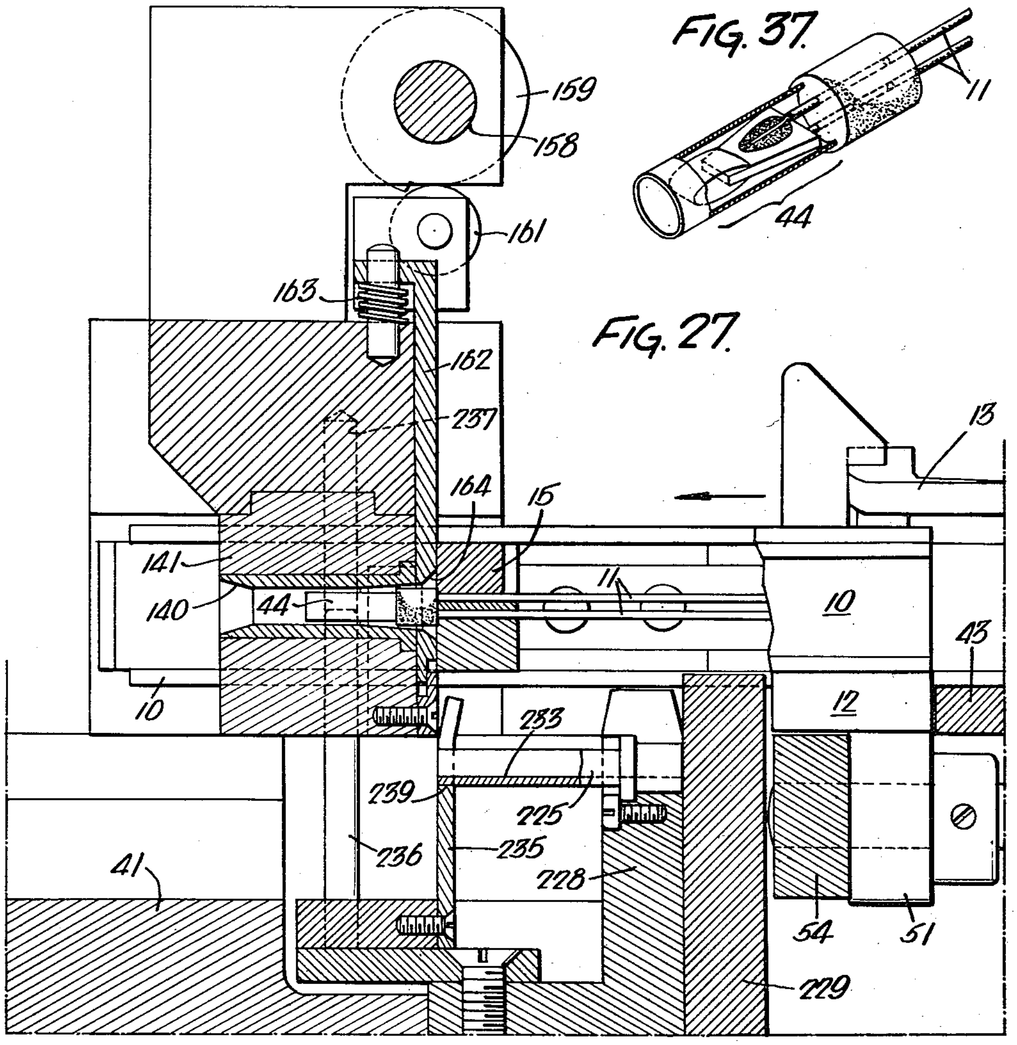
Figures 30, 30A, 36:
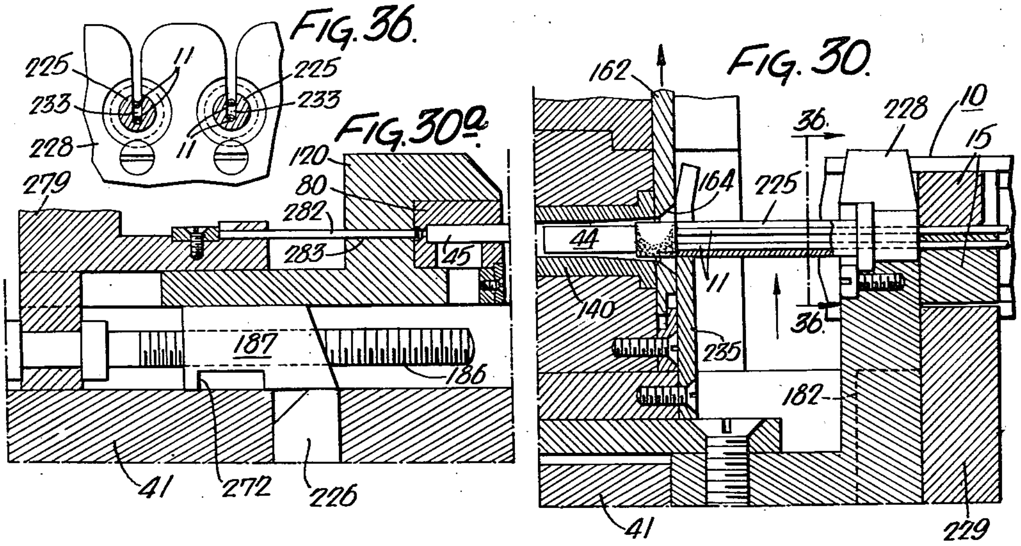
Figure 39:
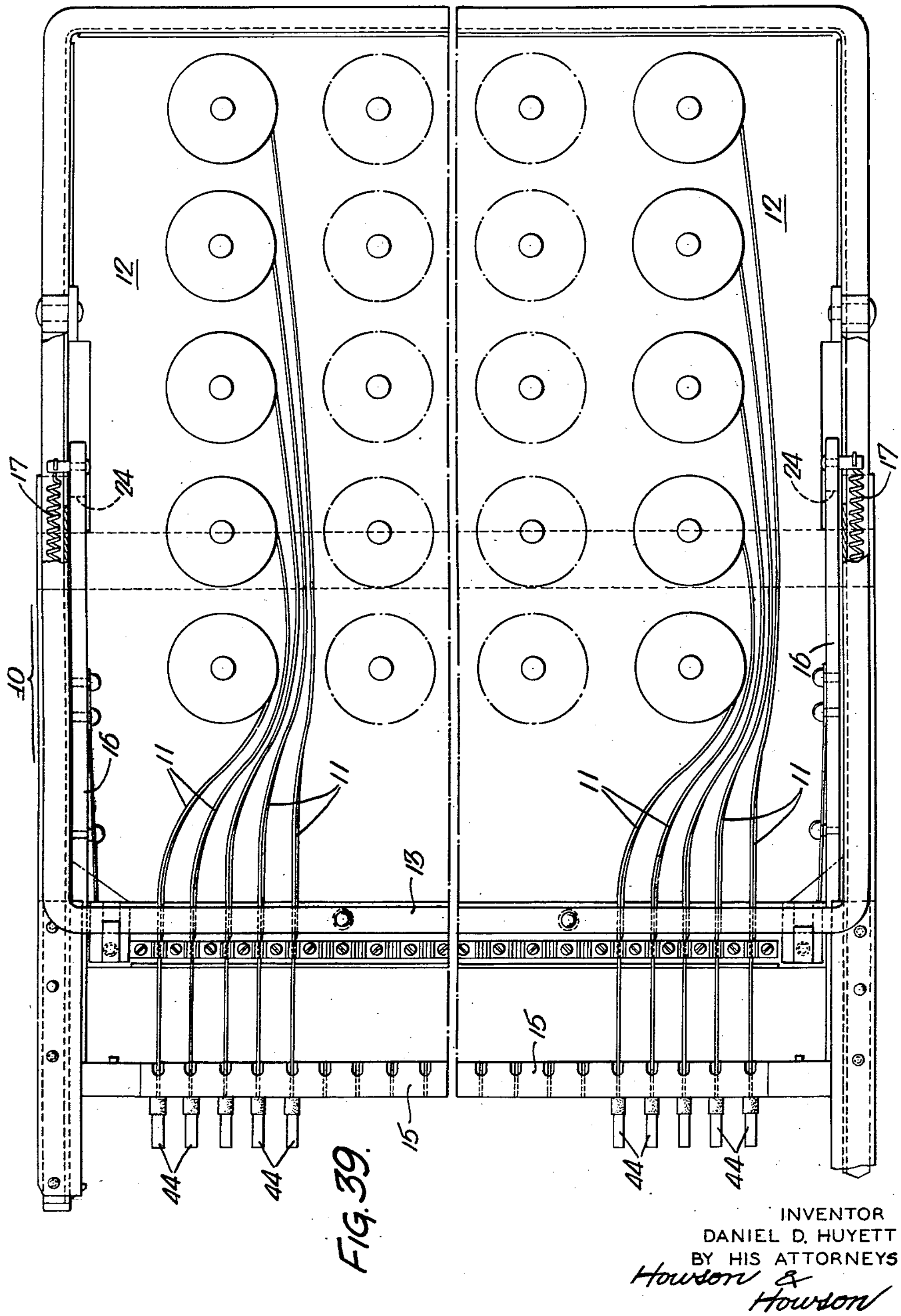
Figure 40:
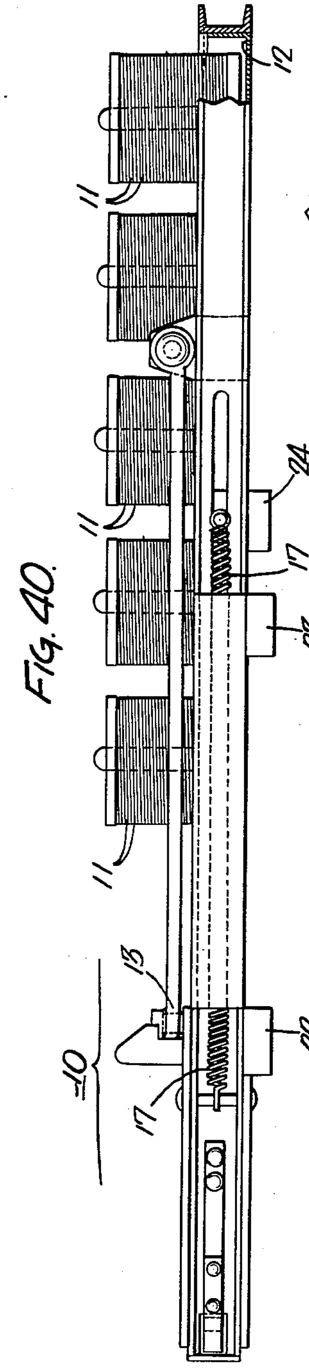
Figure 41:
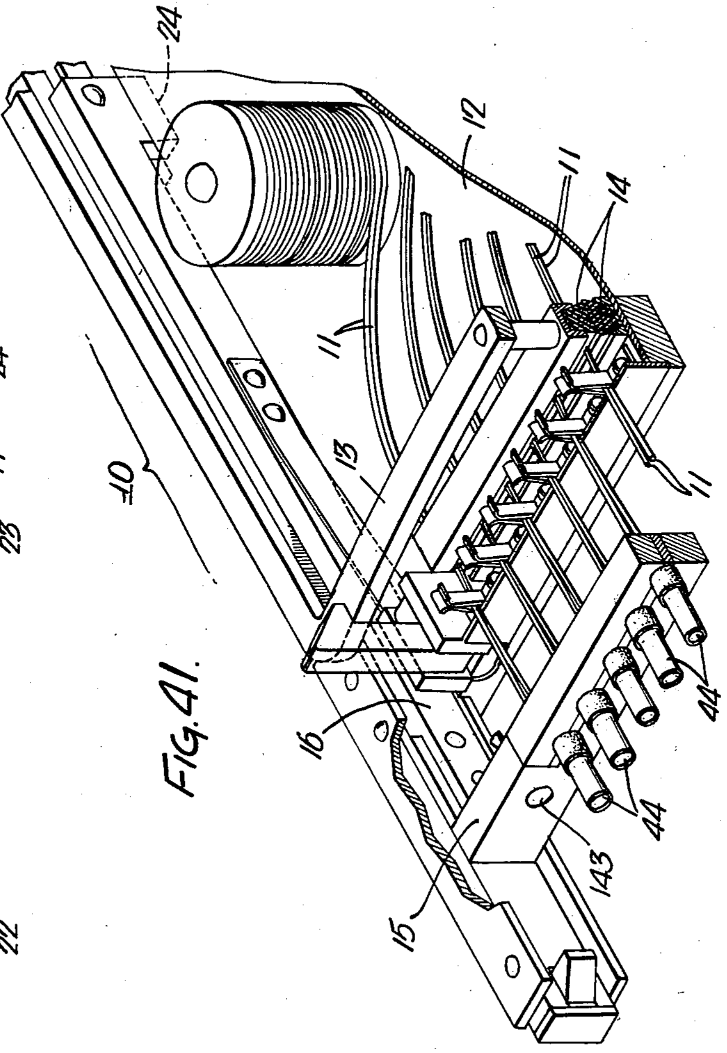
Figures 42, 43:
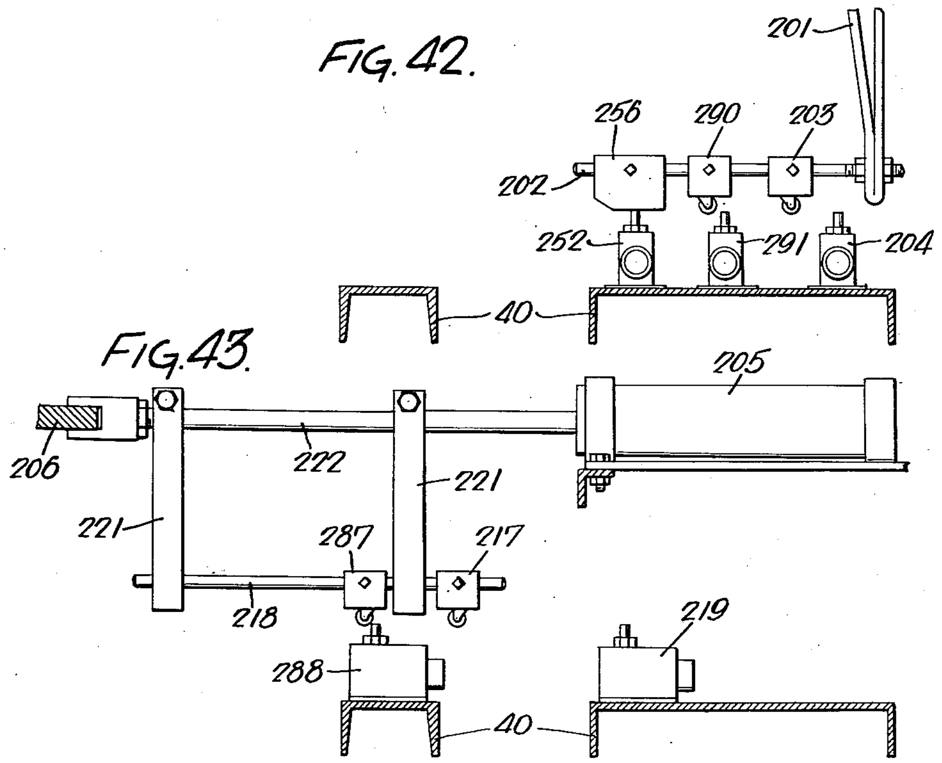
Figure 44:
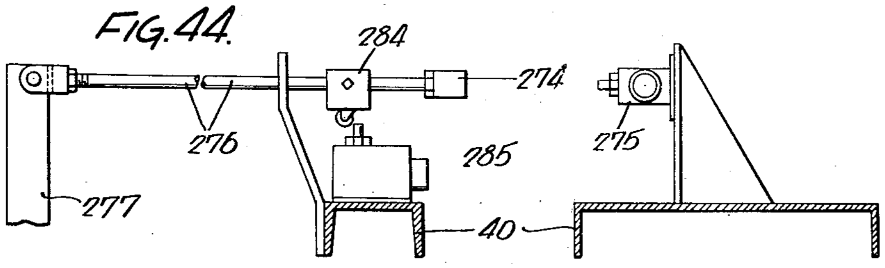
Figure 45:
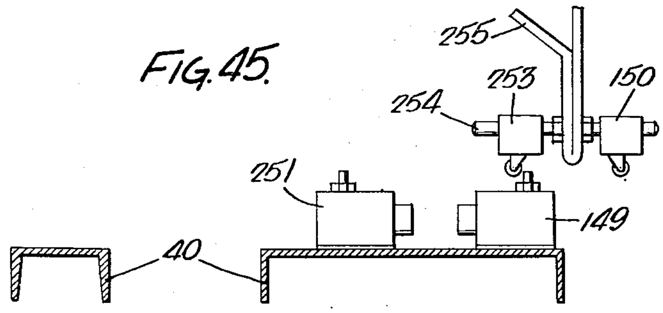
Figure 46:
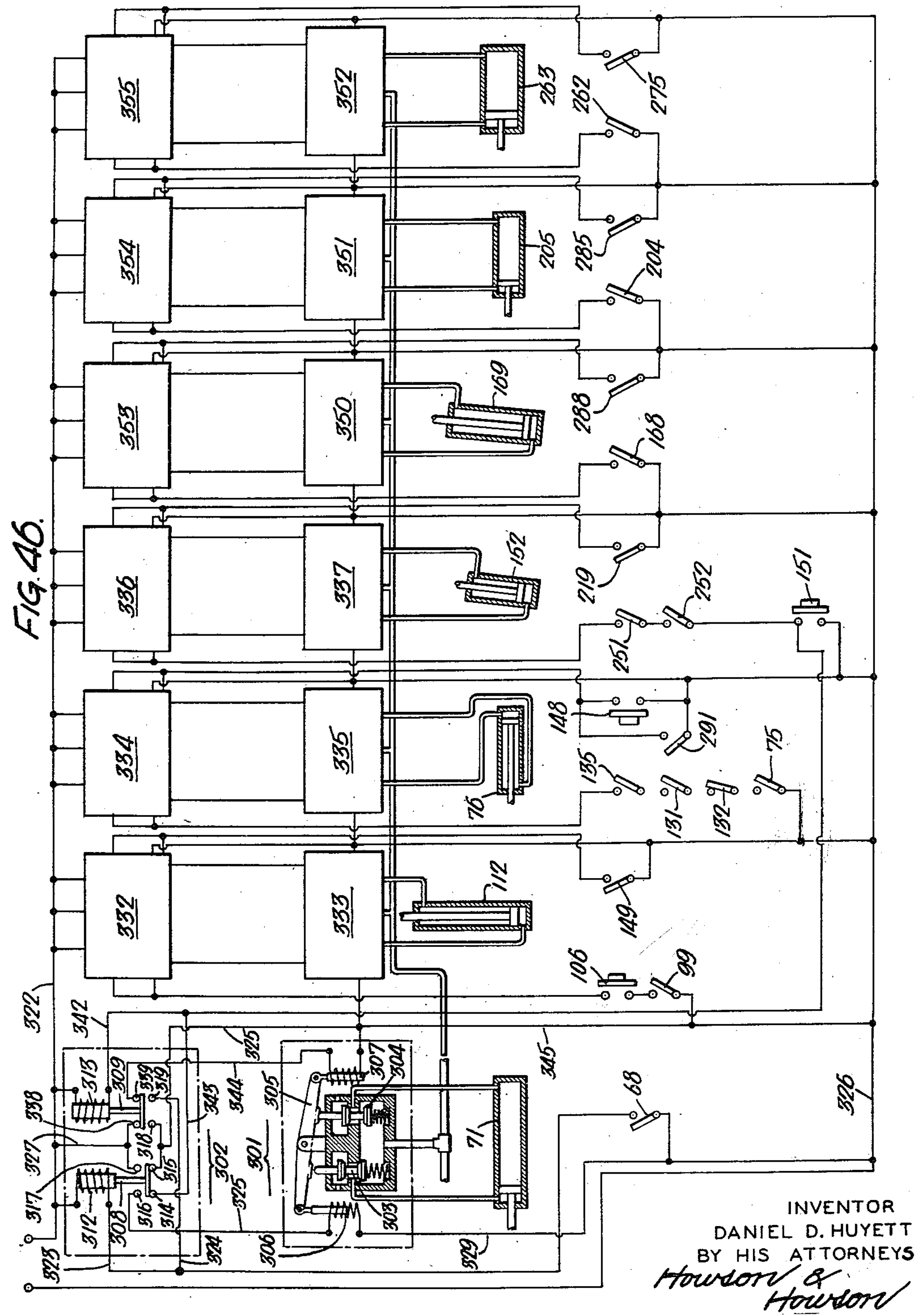

Figs. 27 to 35 inclusive, are fragmentary longitudinal sectional views illustrating the various steps in the operation of the machine;

Fig. 36 is a fragmentary sectional view taken on line 36—36, Fig. 30;

Fig. 37 is a perspective view partially in section illustrating the preformed plug and electric match assembly;

Fig. 38 is a side elevational view partially in section of a completed electric blasting cap or initiator with the plug and match assembly inserted therein;

Fig. 39 is a plan view of the wire conveyor carrier or tray used to support the wires and the plug and match assemblies during the assembling operation;

Fig. 40 is a side elevational view of the wire tray illustrated in Fig. 39;

Fig. 41 is a fragmentary perspective view of a portion of the wire tray;

Figs. 42 to 45 inclusive, are fragmentary side elevational views of the various switch operating members and their associated switches; and, Fig. 46 is a schematic diagram showing the electrical and pneumatic operating controls for the assembling machine.

The present invention is particularly designed to be used as a single station in a production line for the manufacture of electric blasting caps or the like. To this end, a conveyor carrier or tray designated generally as 10 is provided to support wires 11 of the plug and match assemblies. The wire tray is the subject of a copending application Serial No. 254,178 filed October 31, 1951. The initial operation in the manufacture of electric blasting caps is to place the wires 11 in the wire tray 10 and the wire tray is then conveyed to different stations on the production line where the various component parts of the blasting caps are assembled. In the present instance, plug and match assemblies have loaded shells placed thereon as more fully described hereinafter. It will be understood however that the wire tray 10 is not a necessary part of the present invention but only a convenient accessory which allows the present invention to be more easily used in a production line.

With reference to Figs. 39, 40 and 41 of the drawings, the wire tray or carrier 10 comprises a tray portion 12 on which spools or bundles of wires may be placed. The wires extend from the spools or bundles through a clamping member 13 as illustrated in Fig. 41 which securely grips the wires 11 between a pair of rubber elements 14 and prevents displacement of the wires with respect to the wire tray. Positioned at the forward end of the wire tray 10 is a displaceable guide 15 which has a pair of rearwardly extending arms 16 telescopically mounted in the side wall portions of the wire tray, and is normally urged to a forward limit position by means of springs 17 as illustrated in Fig. 40. Extending transversely of the wire tray 10 are front and rear skids 22 and 23, respectively, which allow the tray to be inserted and positioned in the capping machine as more fully described hereinafter. The extreme forward limit position of the displaceable guide 15 is determined by means of a lug 24 extending downwardly from the end of the side arms 16 of the displaceable guide 15 and adapted to bear against the skid 23.

Figure 1:
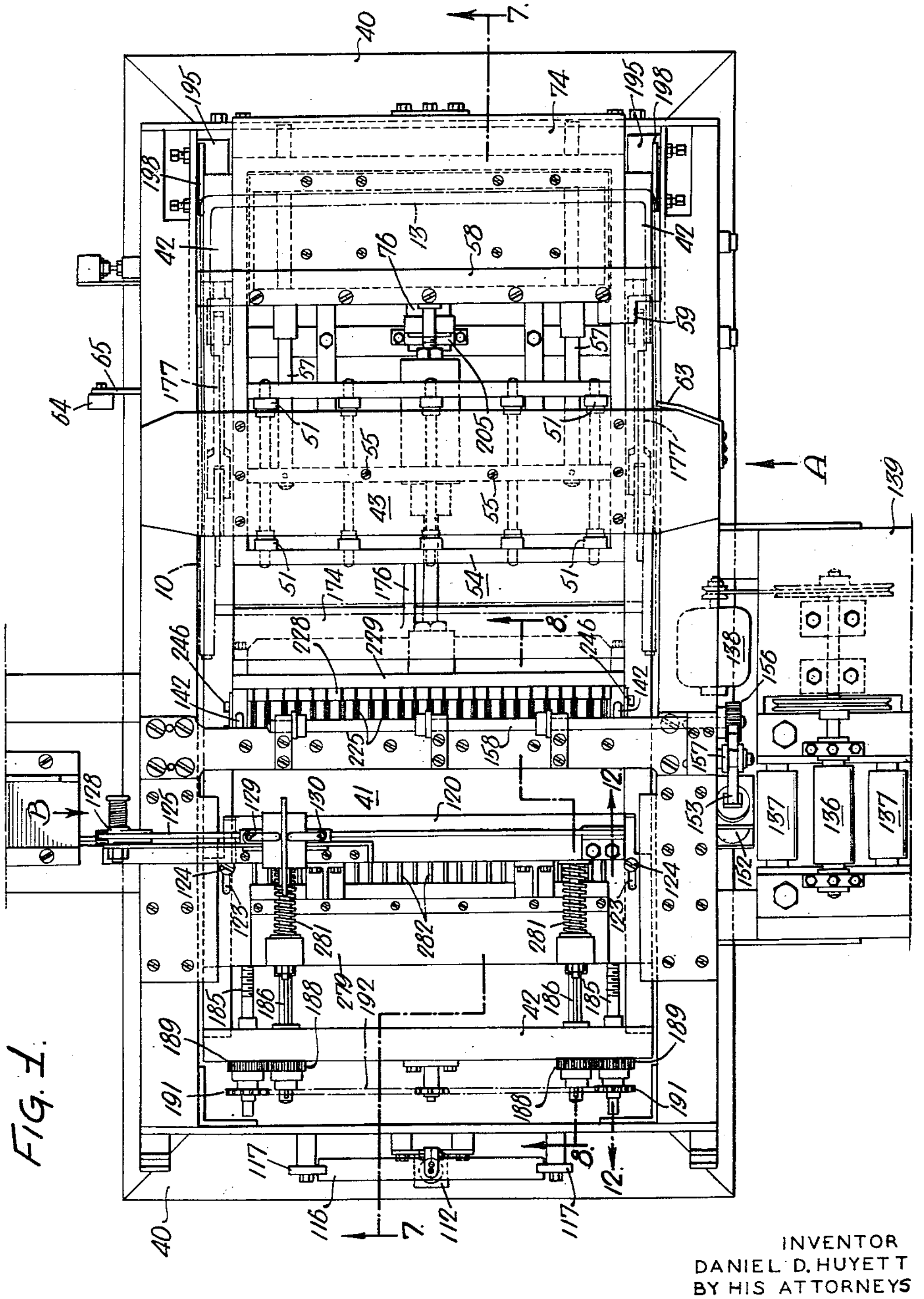
Fig. 1 is a plan view of the electric blasting cap assembling machine made in accordance with the present invention.
Figure 24:
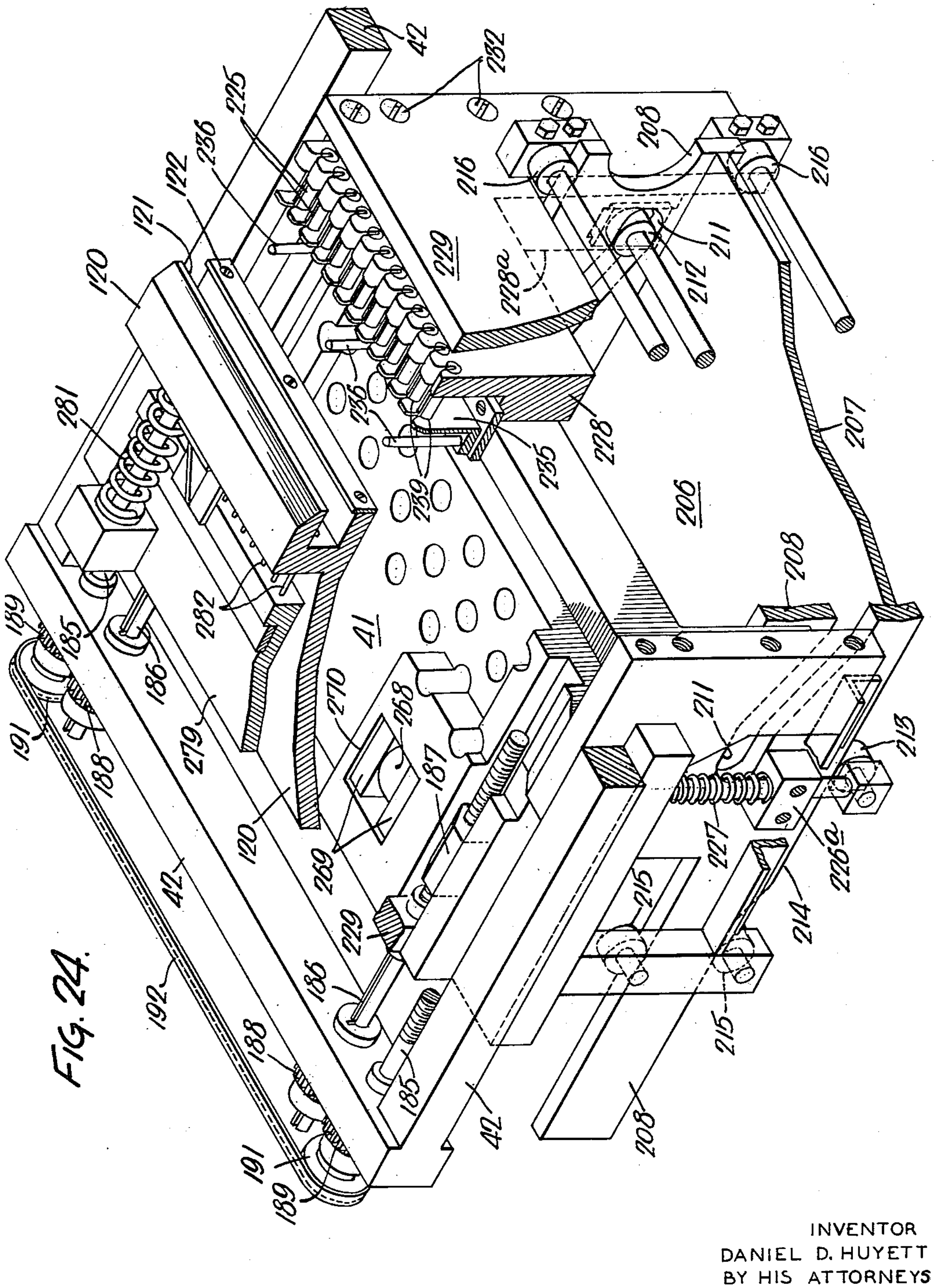
Fig. 24 is a perspective view partially in section illustrating the method of support for the various elements of the assembling machine.

The assembling machine comprises a frame 40 on which a crosshead 41 is slidably mounted. The crosshead 41 in turn carries a yoke 42 mounted for relative longitudinal movement therewith. As illustrated in Figs. 1 and 24, the yoke 42 is generally V-shaped and extends across the forward or left-hand end of the assembling machine and along each side thereof. Slidably mounted on the rear or right end of the yoke 42, as shown in Fig. 1, is a feed table 43 which may be moved longitudinally with respect to the yoke 42 and crosshead 41 as more fully described hereinafter.

In accordance with the present invention, a plurality of plug and match assemblies 44 (see Fig. 37) which are formed previously on the assembly line, are inserted into the tray 10 and the latter placed into the machine at the rear left-hand side thereof as shown at A, Fig. 1. At the same time an equal number of loaded shells 45 mounted in a suitable holder are fed to the machine at the forward right-hand side thereof as indicated at B in Fig. 1. The plug and match assemblies 44 and the loaded shells 45 are carried in axial alignment by the feed table 43 and crosshead 41, respectively, and are brought towards the central portion of the assembling machine where the plug and match assemblies are securely inserted into the shells.

Figure 7:
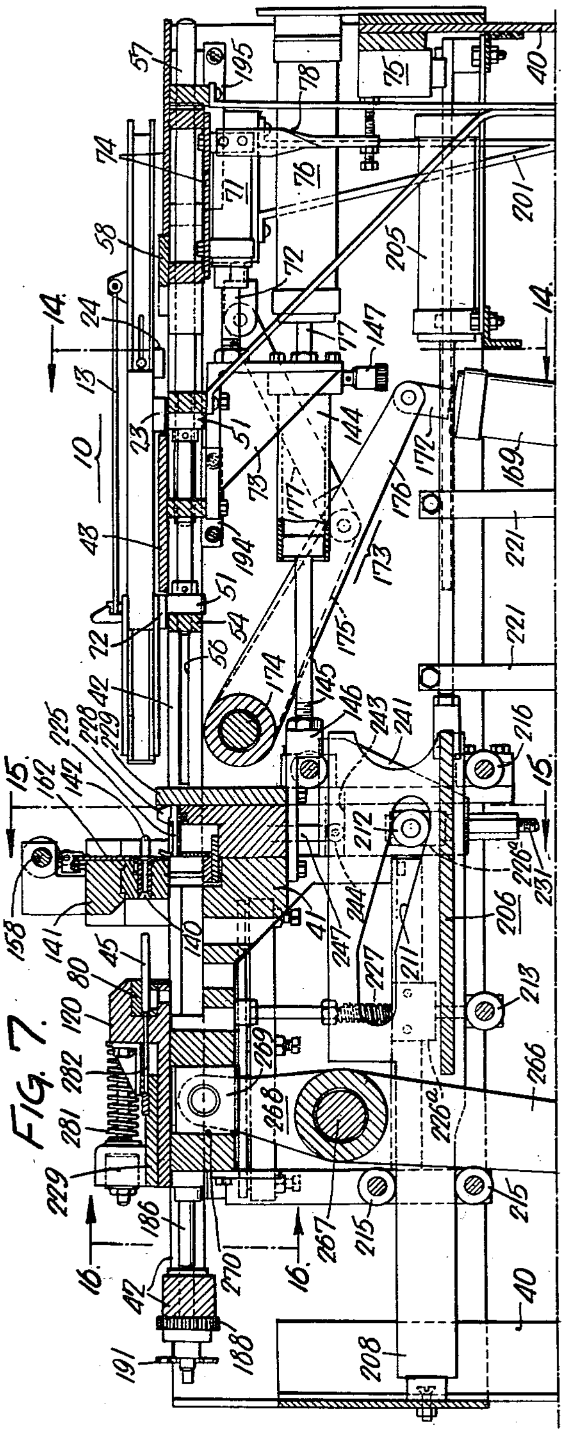
Fig. 7 is a longitudinal sectional view taken on line 7—7, Fig. 1.

Disposed at each side of the assembling machine adjacent the feed table 43 is a pair of conveyors (not shown) which are operable to feed the wire trays 10 to the feed table 43 and remove the same therefrom after the assembling operation, although this may be done manually if desired. As one tray 10 moves forward onto the assembling machine it forces a preceding tray from the feed table and onto a conveyor which removes said tray from the assembling machine. In order to facilitate feeding and removal of the trays, a plurality of rollers 51 are positioned at each side of the feed table 43 on which the front and rear skids 22 and 23, respectively, of the tray 10 are adapted to ride as shown in Figs. 7 and 10.

The rollers 51 are lower than the upper surface of the feed table 43 and the skids 22 and 23 are disposed adjacent each side of the feed table 43 to prevent relative transverse movement of the tray 10 with respect to the feed table 43.

Figures 25, 26:
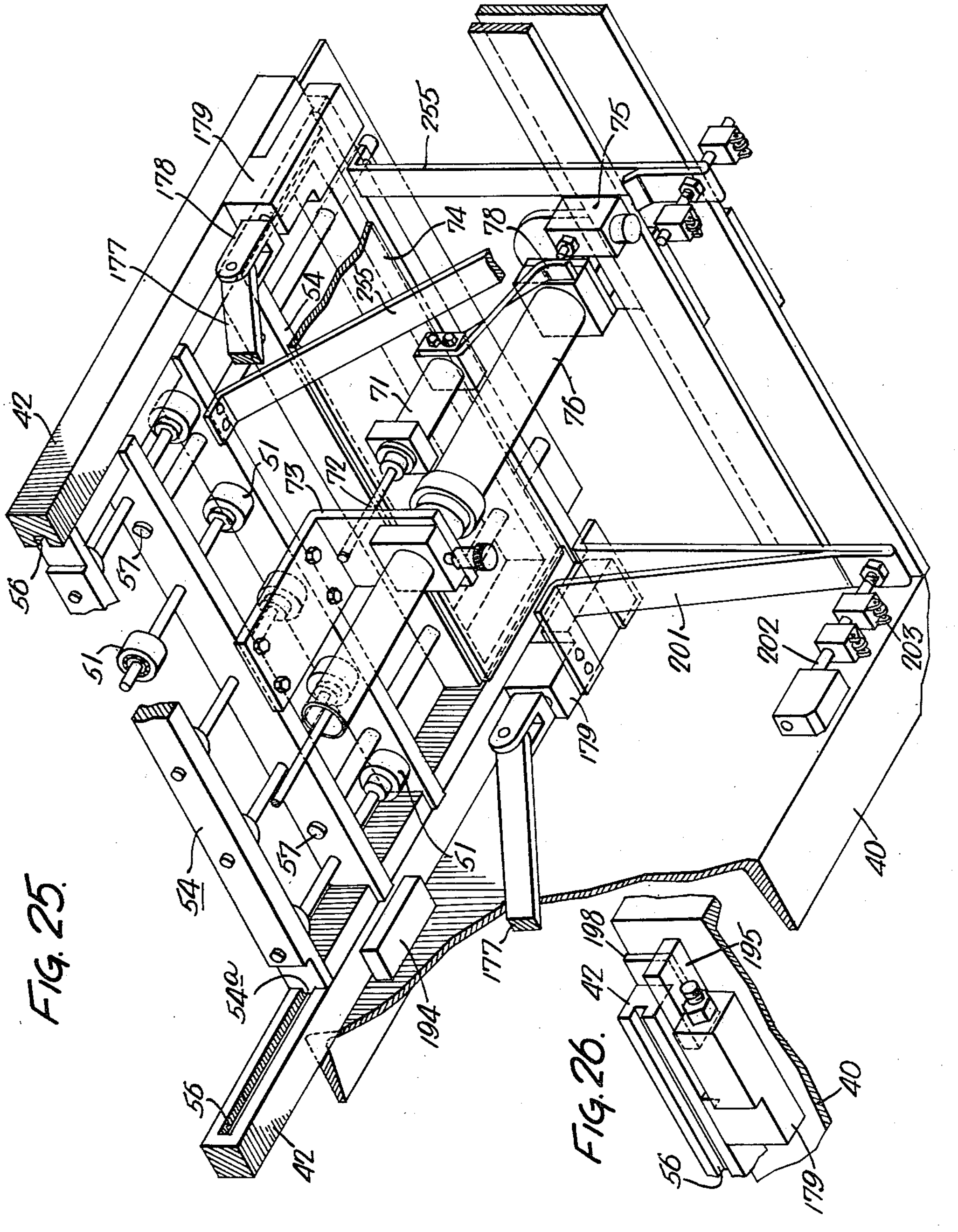
Fig. 25 is a perspective view partially in section illustrating the construction of the rear end of the assembling machine.
Fig. 26 is a fragmentary perspective view of a rear corner of the assembling machine illustrating the method of supporting and guiding the yoke.

As previously described, the feed table 43 is movable longitudinally of the assembly machine in order to insert the plug and match assemblies 44 into the loaded shells 45. To this end, the feed table 43 is fixedly secured to a feed table frame 54, for example, by means of screws 55 as indicated in Fig. 1. The feed table frame 54 in turn has outwardly depending tongues 54*a* along each side thereof which are adapted to be received in grooves 56 along the inner edge of the yoke 42 as shown in Figs. 7 and 25 and thus provide a slidable mounting for the feed table. A pair of slides 57 is secured between cross bars of the feed table frame as shown in Figs. 1, 7 and 25 of the drawings on which a locking plate 58 is slidably mounted. The locking plate 58 may be brought forward with respect to the feed table 43 to prevent relative lateral movement with respect to the feed table 43 of the tray 10 carrying the plug and match assemblies 44.

Figures 9, 10:
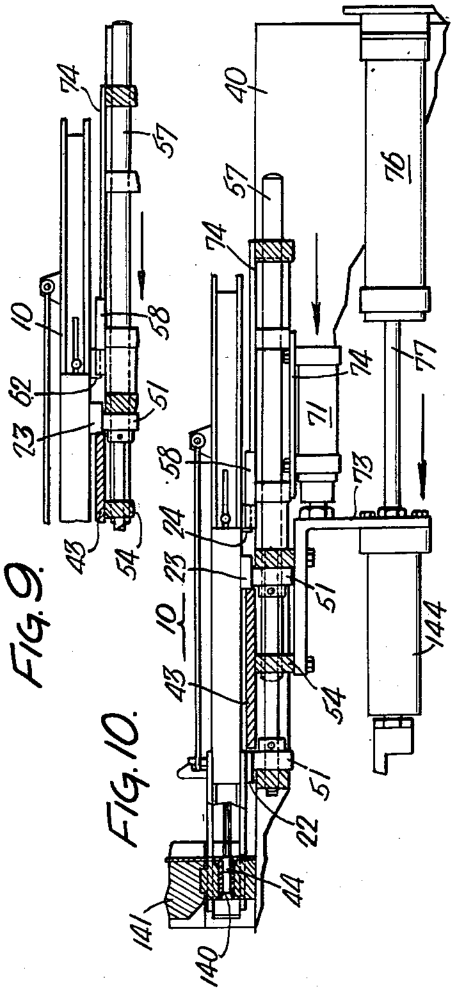
Fig. 9 is a fragmentary sectional view showing the method of securing the assembly line carrier or tray in position.
Fig. 10 is a fragmentary sectional view with the feed table in a forward position and the plug and match assembly entered into the funnel plate.
Figure 11:
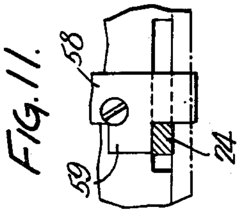
Fig. 11 is a fragmentary plan view showing the method of locking the carrier in position.

With reference to Figs. 1, 10 and 11 of the drawings, the locking plate 58 has an extension 59 on its forward edge which is adapted to engage the lug 24 depending downwardly from the rear edge of the telescopic arm 16 on the wire tray 10. The extension 59 on the locking plate 58 prevents lateral movement of the tray 10 to the right with respect to the feed table 43 while a resilient latch 63 secured to the left end of the feed table 43 engages the rear end of the skid 23 and prevents lateral movement of the tray 10 to the left with respect to the feed table 43. In addition to preventing lateral movement of the tray 10 with respect to the feed table 43, the locking plate 58 also prevents relative longitudinal movement of the guide 15 with respect to the tray 10 for the purpose more fully described hereinafter.

Figure 3:
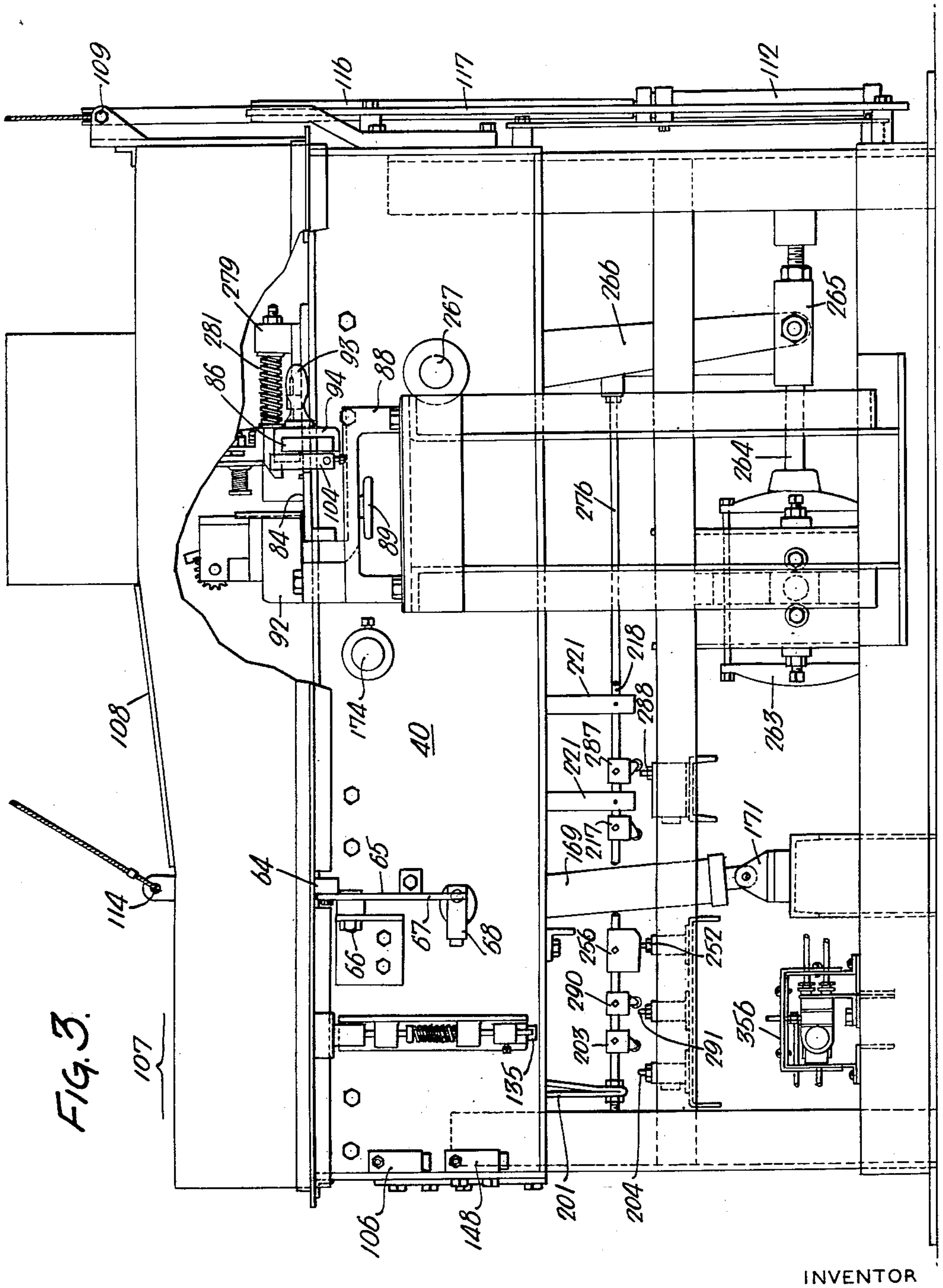
Fig. 3 is a right side elevational view.
Figures 5, 23:
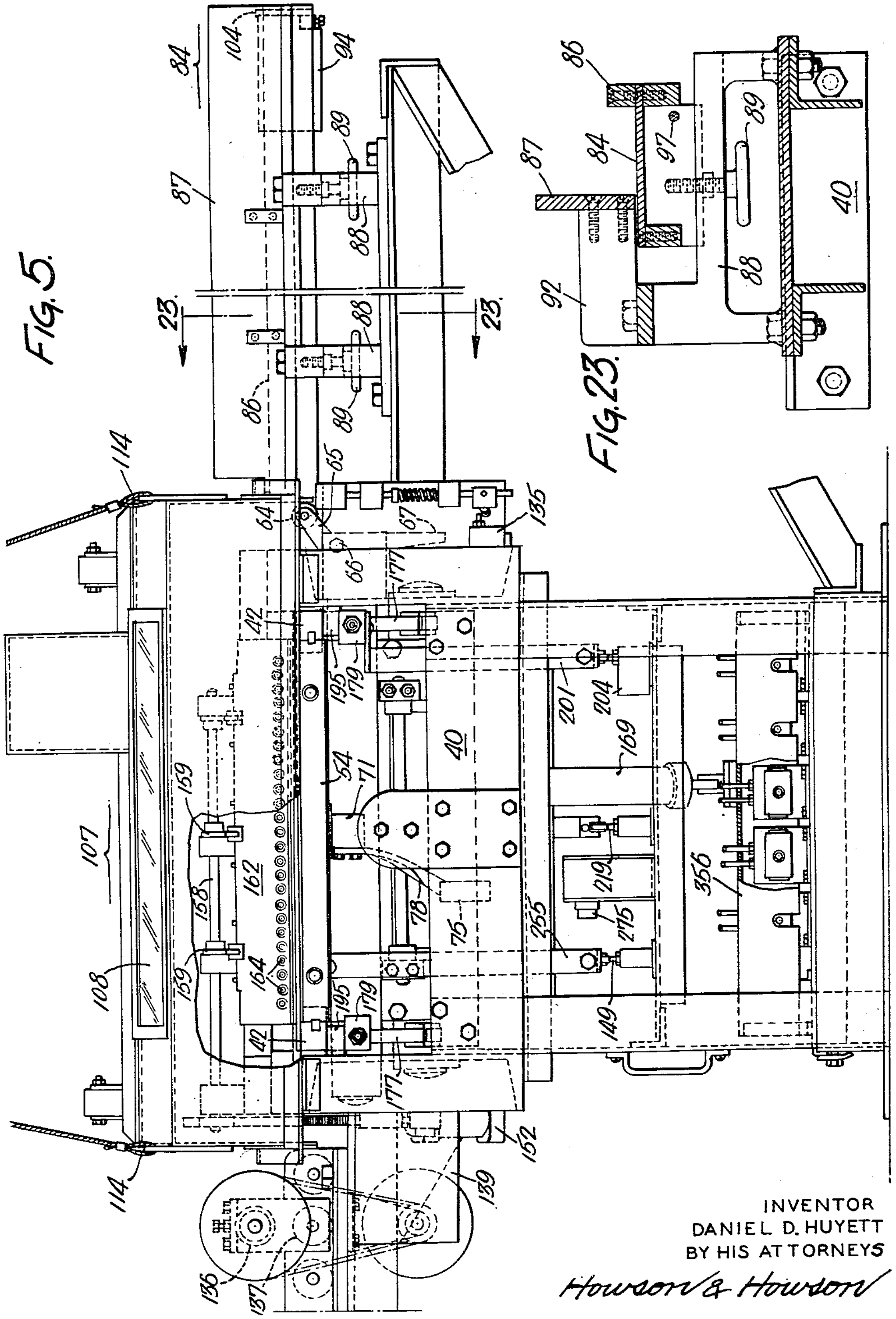
Fig. 5 is a rear elevational view.
Fig. 23 is a transverse sectional view of the cap slide taken on line 23—23, Fig. 5.

With reference to Figs. 1, 3 and 5 of the drawings, ejection of the tray 10 from the feed table 43 causes the rear skid 23 of the tray 10 to contact a roller 64 which is mounted on a lever 65 on the right hand side of the assembling machine. The lever 65 is pivotally mounted to the framework 40 of the assembling machine as indicated at 66 in Fig. 5 and has a downwardly depending portion 67 which contacts a micro-switch 68 when the roller 64 is forced downward by the skid 53. Actuation of the micro-switch 68 permits the air to enter the left hand end of an air cylinder 71. The air cylinder 71 has the forward end of its piston rod 72 fixedly secured to a bracket 73 depending downwardly from the feed table frame 54 while the air cylinder is secured to the locking plate frame 74 as shown in Figs. 7 and 10. When air is forced into the left hand end of the air cylinder 71, the locking plate 58 is brought forward with respect to the feed table 43.

Simultaneously upon actuation of the locking plate 58 in a forward direction a micro-switch 75 is closed. The switch 75 is in series with three other micro-switches, 131, 132 and 135, more fully described hereinafter. When the micro-switches 75, 131, 132 and 135 are all closed, air is caused to enter the right hand end of an air cylinder 76 secured to the frame work of the cap assembling machine. The air cylinder 76 has the forward end of its piston rod 77 fixedly secured to the bracket 73 depending downwardly from the feed table frame 54 so that admittance of air to the right-hand end of the air cylinder 76 causes the feed table 43 to be moved forward. The micro-switch 75 is biased to a closed position but normally is held open by means of a bracket 78 which depends downwardly from the locking plate frame 74 and is arranged so that it is withdrawn from contact with the microswitch 75 as the locking plate 58 is moved forward.

Figure 21:
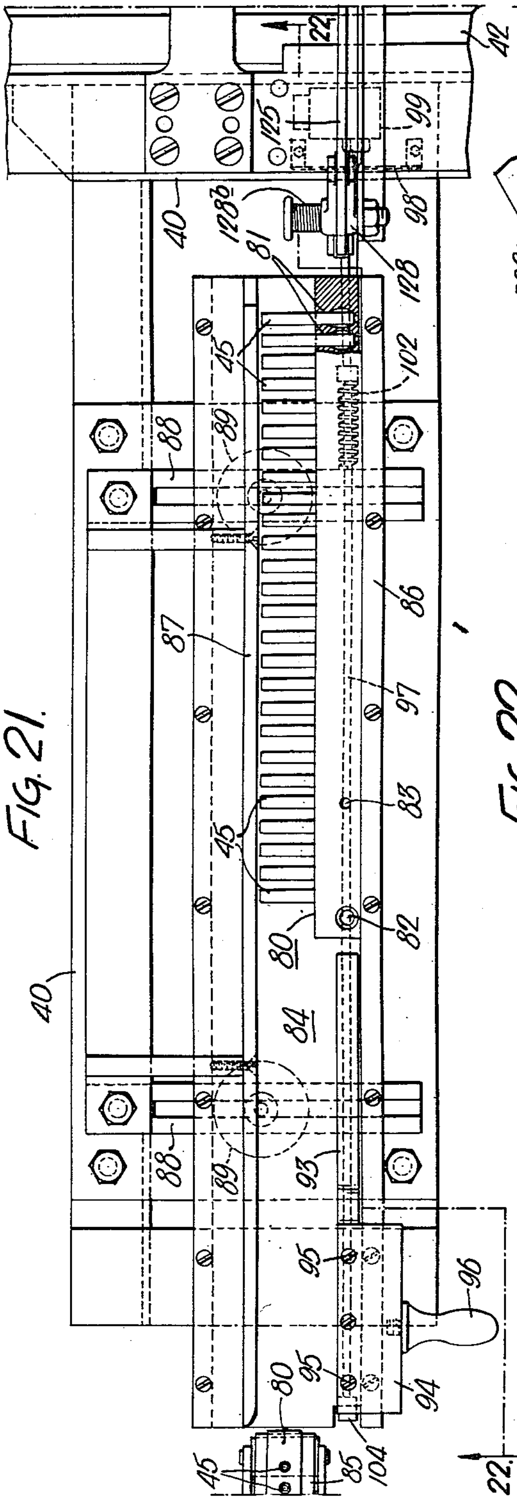
Fig. 21 is an enlarged plan view of the slide used to enter the caps and cap holder into the machine.
Figure 22:
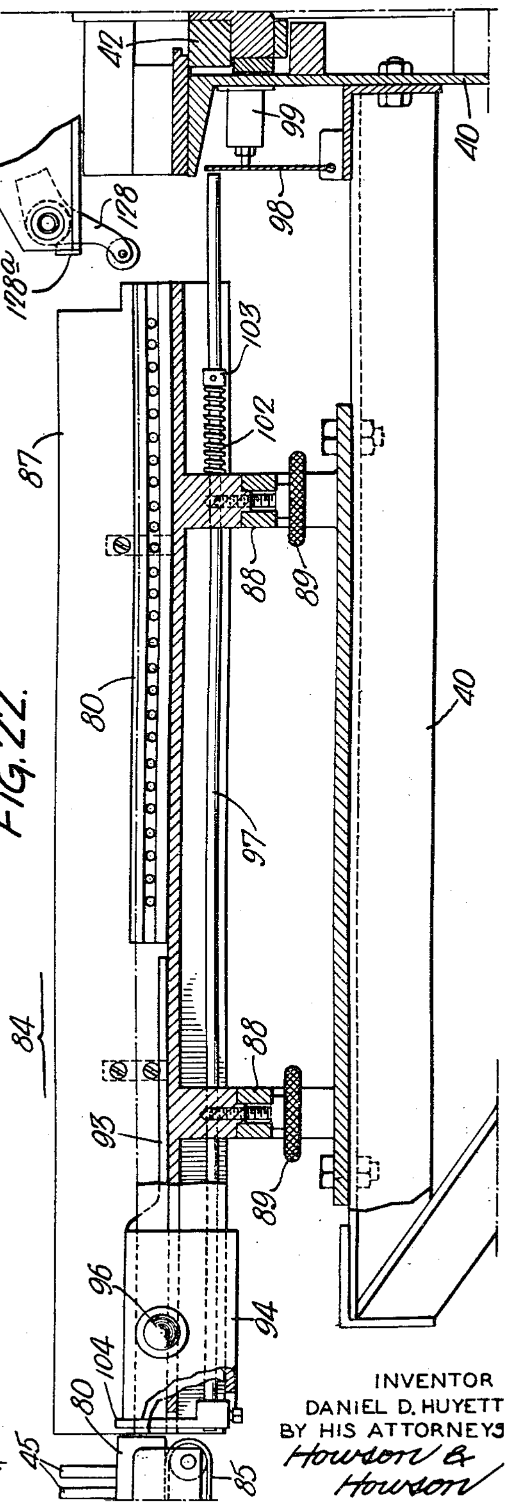
Fig. 22 is a fragmentary sectional view taken on line 22—22, Fig. 21.

Upon positioning of the tray 10 carrying the plug and match assemblies on the fed table 43, a barricaded shell holder 80 shown in Figs. 21 and 22, carrying a plurality of loaded shells 45, is inserted into the forward end of the machine. The holder 80 has a plurality of openings 81 in its forward face in which the loaded shells 45 are placed. In addition, the holder 80 also has a pair of openings 82 and 83 in its upper surface as shown in Fig. 21 which properly position the holder in the assembling machine and also prevent operation of the assembling machine if an empty holder is fed to or allowed to remain in the machine, all as set forth in detail hereinafter.

The loaded shell holders or supports 80 are fed to a table 84 in an upright position by means of a conveyor 85. The operator of the machine takes the loaded holders in their upright position and places them on their side on the table 84 between front and rear guide plates 86 and 87, respectively, as shown in Fig. 21. The guide plates 86 and 87 are adjustable to provide for shells of different length. Since blasting cap shells are made in a variety of sizes, means are provided to quickly adjust the distance between the front and rear guide plates 86 and 87. To this end, the forward guide plate 86 is secured to the table 84 which in turn is carried by a pair of slides 88. A pair of hand wheels 89 as shown in Figs. 22 and 23 lock the table 84 in position on the slides 88. The rear guide plate 87 is bolted to a bracket 92 which is secured to the slides 88 as shown in Fig. 23. In order to adjust for various size shells, the handwheels 89 are loosened and the table 84 may then be moved to the desired position on the slides 88.

Slidably mounted on the forward guide 86 is a push rod 93 by means of which the holders 80 are inserted into the assembling machine. The push rod 93 is secured to a yoke 94 by screws as indicated at 95, and the yoke 94 is slidably mounted on the forward guide 86 as illustrated in Fig. 21. Extending outwardly from the forward face of the yoke 94 is a handle 96 which permits the push rod 93 to be moved with respect to the table 84. Positioned beneath the table 84 is a rod 97 mounted for engagement with a hinged plate 98 which in turn operates a micro-switch 99. The rod 97 is slidably mounted in the support brackets for the table 84 and is normally urged to the right by a spring 102 bearing against and reacting on a collar 103 fixedly secured to the rod 97. The rod 97 is withheld from engagement with the hinged plate 98 when the yoke 94 is in its extreme left hand position by means of the upper portion of the yoke 94 bearing against an adjustable finger 104 secured to the extreme left hand end of the rod 97. When the push rod 93 is being moved to the right or left in order to insert a shell holder 80 into the assembling machine or return to its starting position, the rod 97 opens the normally closed micro-switch 99 as previously described. By this construction, the switch 99 is closed only when the yoke 94 is in its extreme left hand position, thereby preventing operation of the machine while a tray of caps is being inserted therein.

Figure 2:
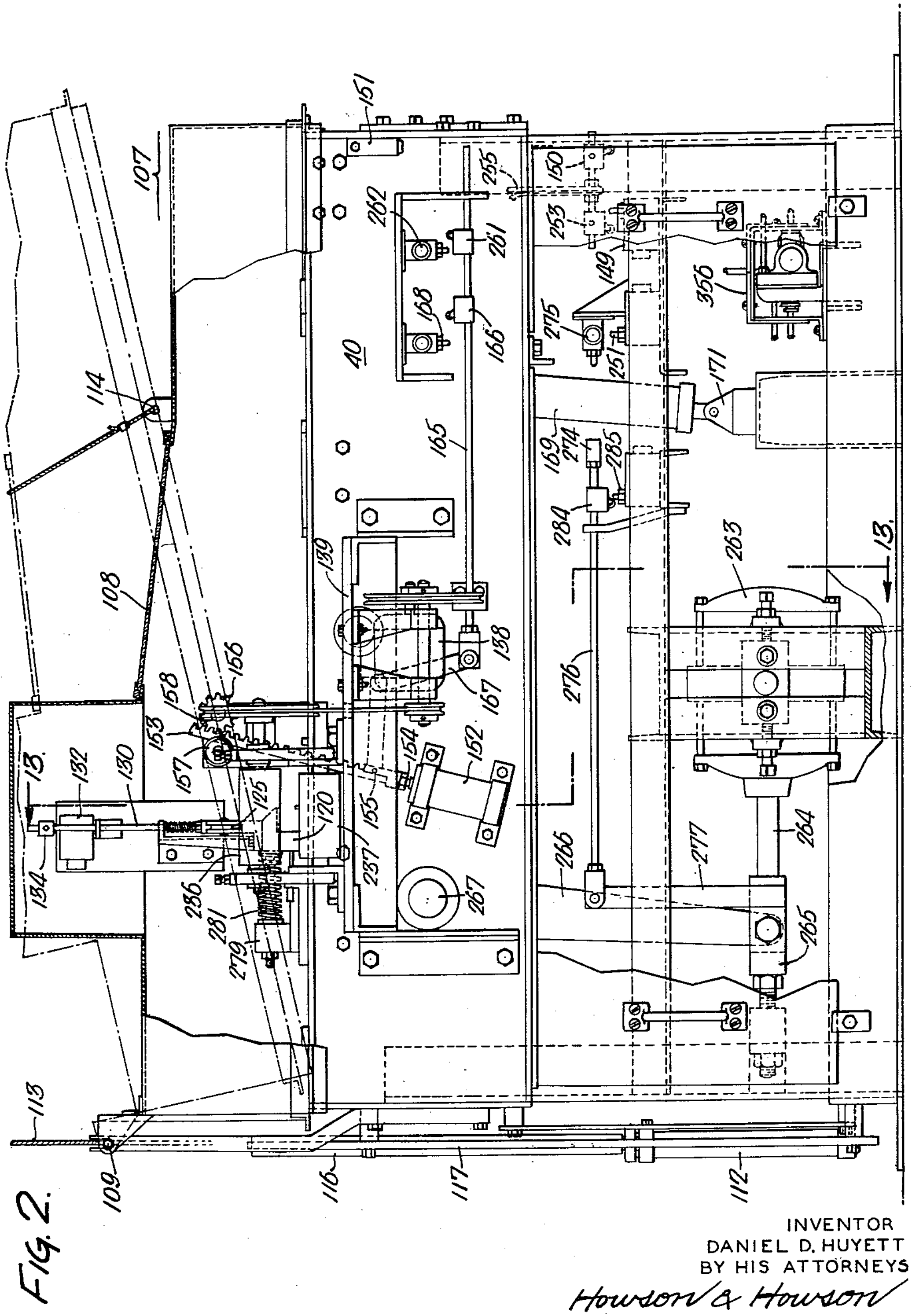
Fig. 2 is a left side elevational view of the assembling machine.
Figure 4:
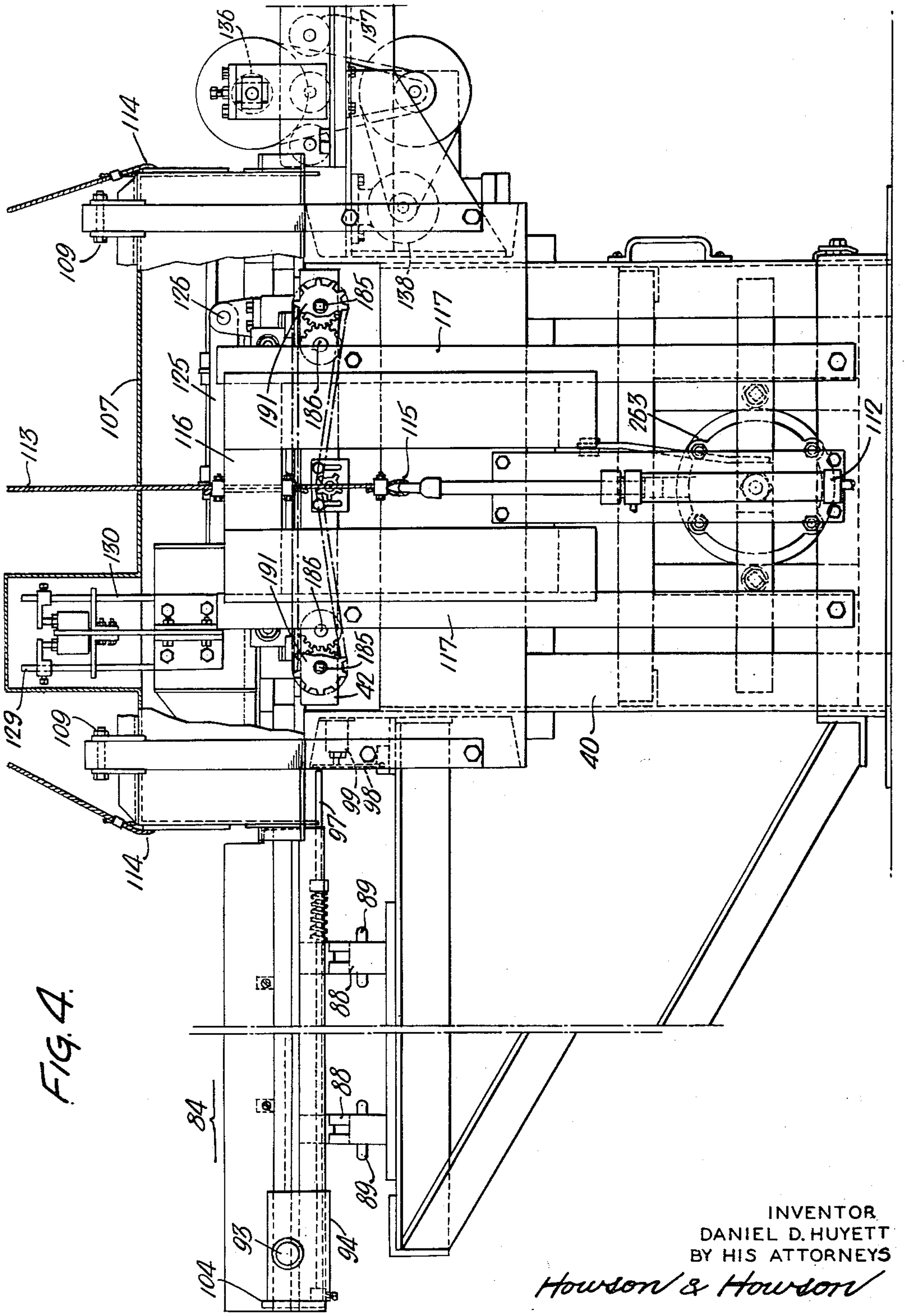
Fig. 4 is a front elevational view.

The micro-switch 99 is in series with a manually operated switch 106 on the rear end of the capping machine and when both of these switches are closed a barricade 107 descends over the top of the assembling machine to give protection to the operator against an accidental explosion. The barricade 107 is made of sheet metal and is adapted to cover the top of the machine as shown in Figs. 2 and 3. A window 108 is provided in the barricade 107 to allow the operator of the machine to make a visual inspection during the assembling process. The barricade is pivotally mounted by means of a pair of hinges 109 on the forward end of the machine and the rear end of the barricade is adapted to be raised by means of an air cylinder 112 as shown in Fig. 4. In order to raise the barricade, a cable 113 is secured thereto as indicated at 114. The cable passes over a pulley (not shown) above the capping machine and is secured to the piston rod of the air cylinder 112 as indicated at 115. Thus actuation of the air cylinder 112 will cause the barricade 107 to be raised or lowered as desired. A counter weight 116 mounted in slides 117 at the forward end of the machine and carried by the cable 113 is provided to counter balance the weight of the barricade and allow the same to be easily raised or lowered.

Figure 13:
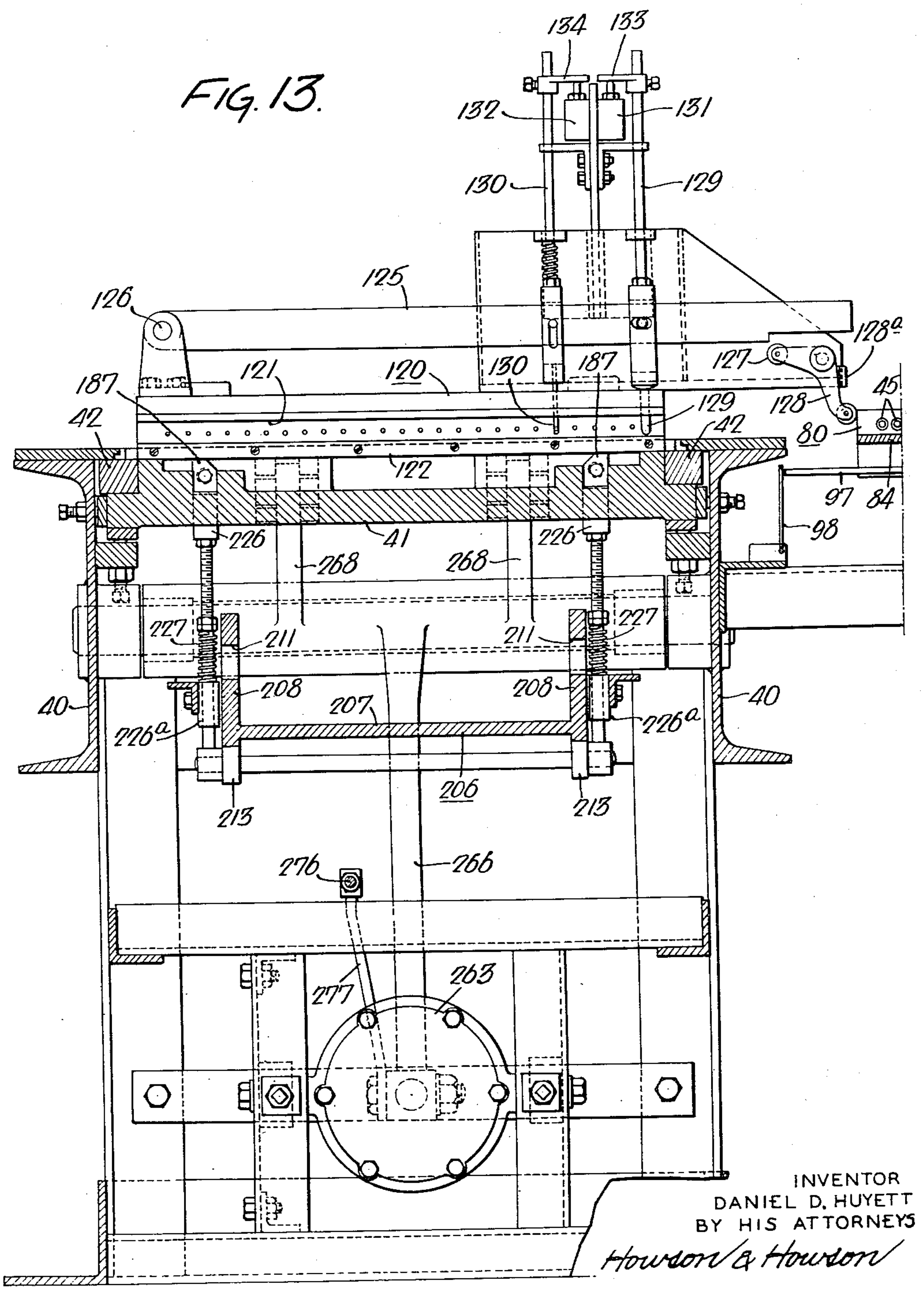
Fig. 13 is a transverse sectional view taken on line 13—13, Fig. 2.
Figures 17, 18:
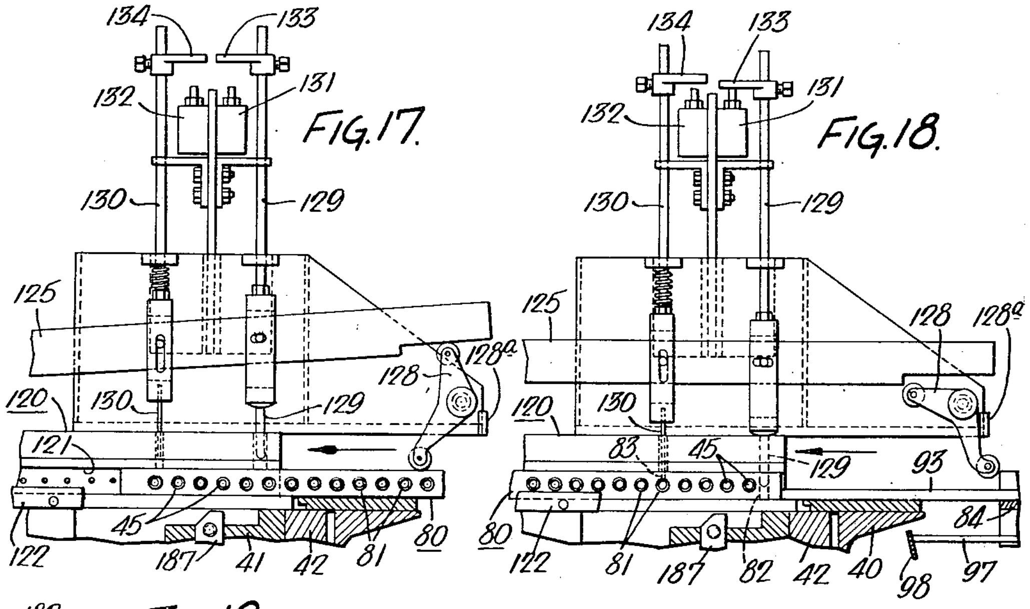
Fig. 17 is a fragmentary elevational view illustrating the caps being entered into the machine.
Fig. 18 is a fragmentary elevational view similar to Fig. 17 showing the caps in position in the machine and the means for determining whether the caps and cap holder are in the proper position.

When a cap holder 80 is inserted into the machine by operation of rod 93 by handle 96 the holder 80 is inserted into the slot 121 of a carriage 120 adjustably mounted on the crosshead 41 as illustrated in Figs. 13, 17 and 18. A plate 122 is secured to the face of the carriage 120 and extending upwardly therefrom across a portion of the slot 121 prevents relative lateral movement of the holder with respect to the carriage. The carriage 120 is adjustably mounted on the yoke 42 to allow the machine to be set for different sizes of shells, as more fully described hereinafter. To this end, a pair of slots 123 is provided at each side of the carriage 120 through which bolts 124 are adapted to pass. The bolts 124 are threaded into the yoke 42 and thus hold the carriage 120 securely in position on the yoke.

Pivotally mounted on one end of the carriage 120 and extending transversely across the assembling machine above the carriage is a positioning bar 125. Suitable means are associated with the positioning bar 125 to lock the holder 80 in place and to preclude operation of the machine if the holder does not contain any shells. The positioning bar 125 is pivotally mounted on the left hand side of the carriage 120 as indicated at 126 and has its right end extending over a roller 127 which operates to pivot the positioning bar about the point 126. As a holder 80 is inserted into the carriage 120 the forward end of the holder engages a bell-crank lever 128 on which the roller 127 is mounted. Further insertion of the holder 80 causes the lever 128 to pivot and thus raise the positioning bar 125. Carried by the positioning bar 125 is a pair of plungers 129 and 130 which are adapted to fit respectively into the openings 82 and 83 in the holder 80. After the holder 80 is forced past the lever 128 the lever 128 is returned to its normal position as shown in Figs. 13 and 18, and the end of the plunger 129 bears against the upper surface of the holder 80. The lever 128 is biased in a counter-clockwise direction against a stop 128*a* by means of a torsion spring 128*b*. When the cap holder 80 is properly positioned in the carriage 120, the plunger 129 drops downward in the opening 82 in the holder and thus prevents further movement of the same with respect to the carriage. At the same time the plunger 130 is allowed to drop downward into the opening 83 in the holder.

The opening 83 communicates with one of the openings 81 in which the loaded shells are placed, and if a shell is in the opening 81 the plunger 130 will bear against the top of the shell. On the other hand, if a shell is not in the opening 81, the plunger 130 will be permitted to drop down and extend into the opening 81. The plungers 129 and 130 operate switches 131 and 132 respectively. The switch 131 is a normally open switch and is closed when a switch-operating member 133 carried at the upper end of the plunger 129 contacts the switch 131. The switch-operating member 133 is so positioned with respect to the switch 131 that it will only contact the switch 131 when the plunger 129 is in its lower limit position, thus indicating that a cap holder is properly inserted in the carriage 120. A second switch-operating member 134 is carried by the plunger 130 and is adapted to operate the micro-switch 132. The micro-switch 132 is a normally closed switch and will only be opened by the switch-operating member 134 if the plunger 130 does not contact the shell. The switches 131 and 132 are in series with the above mentioned switch 75 operated by the locking plate 58. When these three switches are closed due to the shells and plug and match assemblies being properly inserted in the capping machine, lowering the barricade will close a fourth switch 135 in series with the switches 75, 131 and 132 and thus admit air to the right hand end of the air cylinder 76 as previously described. On the other hand, if any of the switches 75, 131 or 132 are not closed air will not be caused to enter the cylinder 76.

Insertion of a second cap holder into the carriage after a capping operation has removed the shells from the first holder will raise the positioning bar 125 and thus withdraw the plungers 129 and 130 from openings 82 and 83 respectively in the first holder. This allows the empty holder to be ejected from the capping machine by the newly inserted cap holder. With reference to Figs. 1, 4 and 5 of the drawings, as the forward end of the ejected holder passes the edge of the capping machine it is gripped by an upper driven roller 136 and a plurality of lower free-running rollers 137. The rollers 136 and 137 are covered with a soft pliable friction material so that they firmly grip the ejected holder and pull it free of the assembly machine, after which it is placed on a conveyor (not shown). The roller 136 is driven by means of a motor 138 as shown in Fig. 4 and is rotated continuously while the assembling machine is operating. The motor 138 and the rollers 136 and 137 are supported on a framework 139 secured to the side of the assembling machine and serve to remove the empty holders from the machine.

Upon admittance of air to the right hand end of the air cylinder 76 the feed table 43 is forced forward and the plug and match assemblies 44 are inserted in funnels 140 formed in a funnel block 141, a separate funnel being provided for each plug and match assembly. The plug and match assemblies 44 are directed into the funnels 140 by means of the displaceable guide 15 carried at the forward end of the wire frame 10. The guide in turn is properly positioned with respect to the funnel block 141 by a pair of pins 142 which are adapted to fit in openings 143 at each side of the forward face of the guide 15. The locking plate 58 in this instance serves to hold the guide 15 in its extreme forward position and thus force it on to the pins 142. In order to prevent the plug and match assemblies 44 from being inserted too rapidly into the funnel 140 a dash pot 144 is carried by the bracket 73 extending downwardly from the feed table frame 54 with the forward end of its piston rod 145 secured to the frame work of the assembling machine as indicated at 146. The escape of air from the dash pot may be regulated by a valve 147 and the dash pot operates in the usual manner to slow the forward movement of the feed table 43.

A pause is provided in the operation of the assembling machine after the plug and match assemblies have been inserted into the funnels in order to determine whether or not the plug and match assemblies are properly positioned in the funnels. If the plug and match assemblies are not properly positioned in the funnels 140, the operator of the machine may retract the feed table 43 by closing a manually operated switch 148 on the rear end of the machine. Closing the switch 148 admits air to the left hand end of the cylinder 76 and thus withdraws the plug and match assemblies 44 from engagement with the funnels 140. Upon withdrawal of the feed table 43, a micro-switch 149 is momentarily closed by a switch operating member 150 carried by the feed table frame 54 thereby admitting air to the upper end of the air cylinder 112 and raising the barricade 107 to allow the operator to properly align or correct the plug and match assemblies 44. After the plug and match assemblies are in proper alignment the operator of the machine closes the switch 106 thereby lowering the barricade and causing the feed table to be brought forward thus inserting the plug and match assemblies in the funnels as previously described.

According to the present invention, after the plug and match assemblies are properly inserted in the funnels 140, a hand operated switch 151 on the rear end of the assembling machine is closed to cause the machine to complete the assembling operation. The switch 151 is in series with two other micro-switches 251 and 252, more fully described hereinafter, and when these three switches are closed air will be admitted to the lower portion of an air cylinder 152 which is secured to the side of the assembling machine as illustrated in Fig. 2. This causes the rear end of the plugs to be gripped and thus securely holds the plug and match assemblies in the funnels 140 during a portion of the subsequent phases of operation.

The two micro-switches 251 and 252 which are in series with the hand operated switch 151 are closed when the feed table 43 and yoke 42, respectively, are in their forward position. Both of these switches must be closed before the cylinder 152 will operate. The switch 251 is actuated by switch operating member 253 secured to a rod 254 positioned in a spaced parallel relationship with the arms of the yoke 42. The rod 254 is in turn carried by a bracket 255 depending downwardly from the cross members of the feed table frame 54. As illustrated in Fig. 3, the micro-switch 252 is contacted by a switch operating member 256 operable to close the micro-switch 252 when the yoke 42 is in its forward limit position as more fully described hereinafter.

Figure 28:
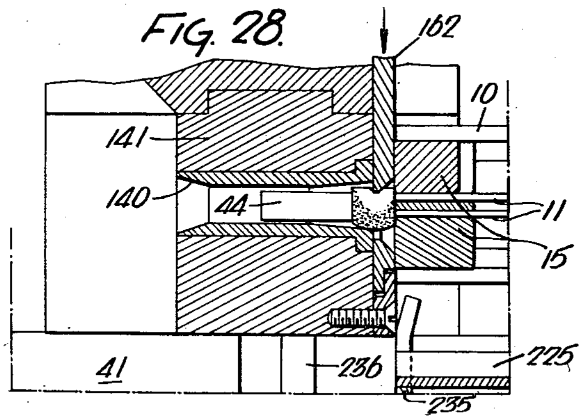
Figure 29:
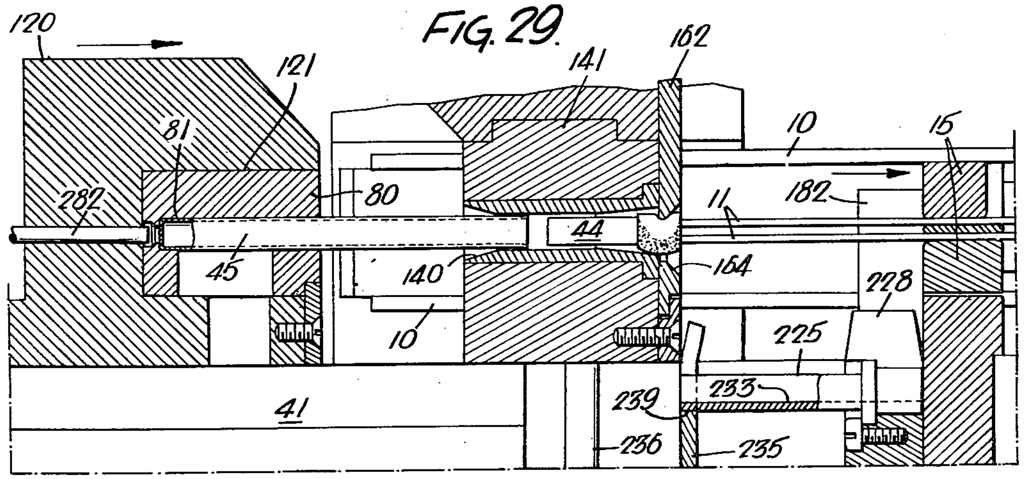

The air cylinder 152 has a rack 153 secured to its piston rod 154 as indicated at 155. The rack 153 is mounted in engaging relationship with a pinion 156 and is held in this position by a roller 157 as indicated in Figs. 1 and 2. Extending transversely across the assembling machine is a shaft 158 on which the pinion 156 is fixedly secured. The shaft 158 carries a plurality of cams 159, illustrated in Figs. 15 and 27, which engage rollers 161 carried on the upper surface of a face plate 162 that is resiliently held in an upper position by means of a plurality of springs 163. The face plate 162 abuts the funnel block 141 and has a plurality of openings 164 therein in axial alignment with the funnels 140. Rotation of the cams 159 by raising the rack 153 causes the face plate 162 to be moved downwardly and thus grip the plugs between the upper surface of the openings 164 and the lower surface of the funnels 140 as illustrated in Fig. 28. This prevents movement of the plug and match assemblies 44 with respect to the funnels 140.

Simultaneously upon actuation of the switch 151 which allows air to enter the lower end of the air cylinder 152, air is also permitted to enter the forward end of the air cylinder 71. This returns the locking plate 52 to its rearward position. In this position, the guide 15 may be easily displaced rearwardly as more fully described hereinafter.

Upon actuation of the air cylinder 152, a rod 165 which carries a switch operating member 166 is moved towards the forward end of the machine. The rod 165 is attached to one end of a bell-crank lever 167 which is pivoted at its mid-point to the framework of the assembling machine. The other end of the lever 167 is secured to the piston rod 154 of the air cylinder 152 as illustrated in Fig. 2. Thus actuation of the air cylinder 152 operates the rod 165 so that, during the forward stroke of the rod 165, the switch operating member 166 momentarily closes a micro-switch 168 which operates to admit air to the lower end of an air cylinder 169. The air cylinder 169 is pivotally mounted on a bracket 171 on the lower portion of the assembling machine and the piston rod 172 of the air cylinder 169 is secured to a toggle 173. The toggle 173 is pivotally mounted on a shaft 174 extending transversely across the assembling machine and comprises two side arms 175 and a central arm 176 to which the piston rod 172 is secured. Secured to the side arms 175 of the toggle 173 is a pair of toggle clevises 177 which are connected to the yoke 42 by means of an adjusting screw 178 and block 179.

With reference to Fig. 25, the adjusting blocks 179 are firmly attached to the rear arms of the yoke 42 and have the adjusting screws 178 adjustably threaded therein. Admittance of air to the lower portion of the air cylinder 169 rotates the toggle 173 in a counterclockwise direction about the shaft 174 and thus raises the forward end of the toggle clevises 177 to force the yoke 42 towards the rear of the assembling machine. A dual function is accomplished during this operation. First of all, the loaded shells 45 which are supported in the carriage 120 are inserted into the forward end of the funnels 140 to a position illustrated in Fig. 29. Secondly, a pair of pins 182 which extend upwardly through openings 183 in the mid-portion of the side arms of the yoke 42 engage the forward surface of the guide 15 and force the guide rearwardly with respect to the funnel block 141 and the wire tray 10 to a position illustrated in Fig. 29. The loaded shells 45 and the guide 15 are held in this position during the subsequent phases of the assembling operation until the shells are ready to be ejected from the cap holders 80.

As previously described, the yoke 42 is slidably mounted on the cross head 41 and has the carriage 120 adjustably mounted thereon by means of bolts 124. Thus as the yoke is moved towards the rear of the machine the carriage is moved in a like manner and the shells carried by the carriage are inserted into the rear of the funnels 140. With reference to Figs. 1, 4, 12 and 16 of the drawings, a pair of adjusting screws 185 are rotatably mounted in the yoke 42 and are threaded into the crosshead 120. After the bolts 124 are loosened, the carriage may be positioned with respect to the yoke by rotating the adjusting screws 185.

A second pair of adjusting screws 186 are rotatably and slidably mounted in the yoke 42 and are threaded into a pair of latch blocks 187, the purpose of which is more fully described hereinafter. The pitch of the threads on the adjusting screws 185 and 186 are similar and the screws are adapted for simultaneous rotation in opposite directions so that as the carriage 120 and its adjusting screw 186 are moved forward with respect to the crosshead, the latch blocks 187 remain stationary with respect to the crosshead. Carried at the outer ends of the adjusting screws 185 and 186 and rotatable therewith is a pair of gears 188 and 189, respectively, which are meshed with each other so that rotation of one pair of adjusting screws in one direction causes simultaneous rotation of the other pair of adjusting screws in the opposite direction.

Each of the adjusting screws 185 has a sprocket 191 secured to its outer end about which a chain 192 passes. The adjusting screws 185 also have a square portion 193 at their extreme outer end adapted to be engaged by a crank (not shown). As the crank is placed on one of the adjusting screws 185 and rotated in order to position the carriage, the opposite adjusting screw 185 also is rotated in a similar manner by means of the chain 192 and sprockets 191. At the same time, the adjusting screws 186 are rotated in the opposite direction in order to permit the latch blocks 187 to remain stationary.

With reference to Figs. 7, 24 and 25 of the drawings, the yoke 42 extends across the forward end of the assembling machine and horizontally along each side thereof. The forward end of the yoke is carried by the cross head 41 while the central and rear portion of the yoke arms are supported by bearing blocks 194 and 195, respectively. The bearing blocks 194 and 195 are fixedly secured to the framework of the assembling machine by means of bolts 196 and 197, respectively, and support the yoke 42 in a horizontal position. Guide plates 198 adjustably secured to the frame of the assembling machine by means of bolts 199 as shown in Fig. 1 engage the outer surfaces of the extreme end portions of the yoke arms and prevent relative lateral movement of the yoke with respect to the assembling machine.

Figure 6:
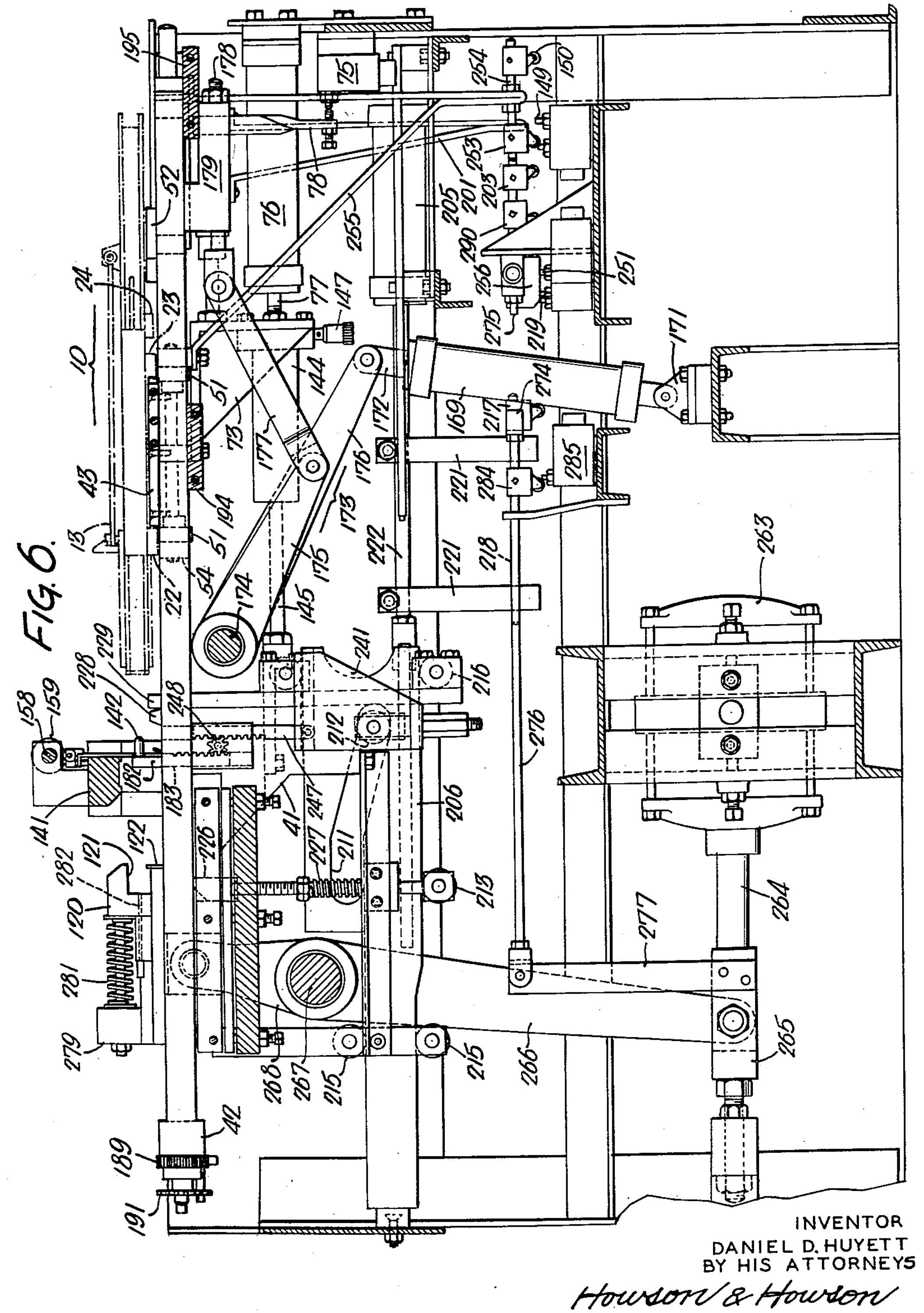
Fig. 6 is a left side elevational view with the cover plate removed.

Depending downwardly from one of the adjusting blocks 179 and fixedly secured thereto is a bracket 201 which carries a rod 202 disposed in a generally parallel spaced relationship with the arms of the yoke 42. The rod 202 has a switch operating member 203 thereon adapted to momentarily close a micro-switch 204 when the yoke 42 is moved rearwardly by means of the cylinder 169 previously described. Actuation of the micro-switch 204 operates to admit air to the forward end of an air cylinder 205. The air cylinder 205 is secured to a cam plate 206 as illustrated in Figs. 6 and 7, and admittance of air to the forward end of the air cylinder 205 moves the cam plate 206 towards the rear of the assembling machine.

Figures 8, 12, 16:
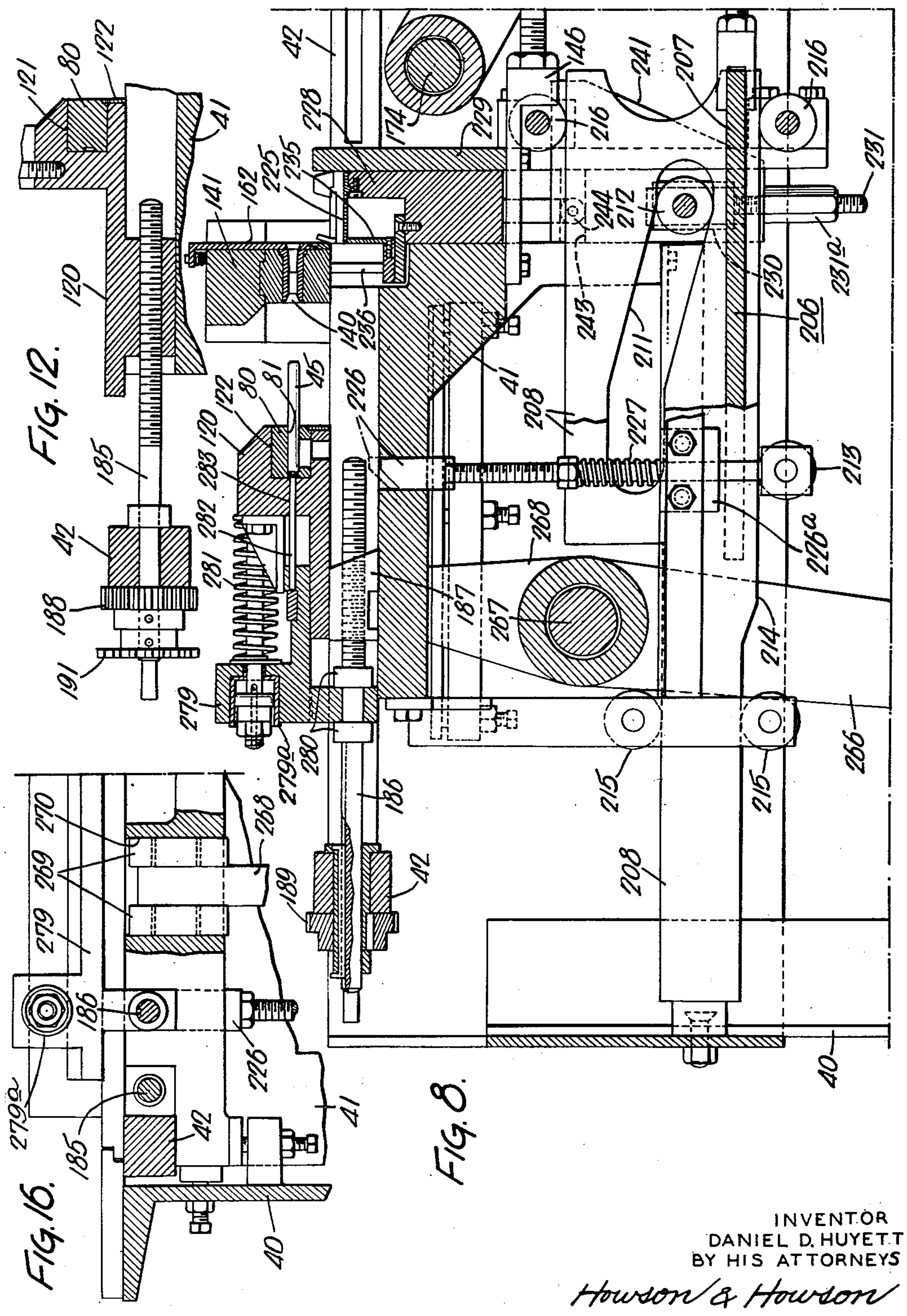
Fig. 8 is an enlarged longitudinal sectional view taken on line 8—8, Fig. 1.
Fig. 12 is an enlarged fragmentary sectional view taken on line 12—12, Fig. 1.
Fig. 16 is a fragmentary transverse sectional view taken on line 16—16, Fig. 7.
Figure 14:
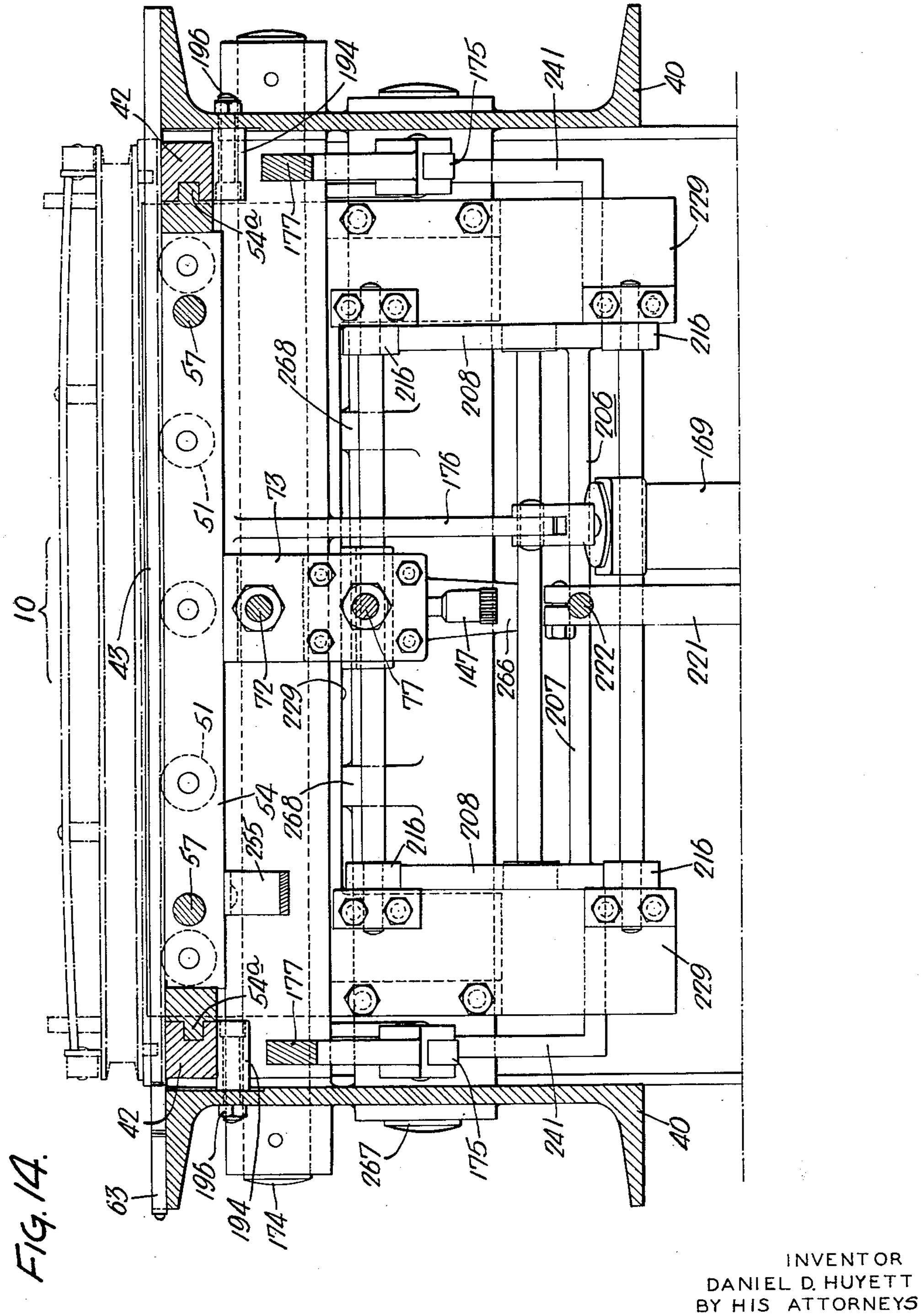
Fig. 14 is an enlarged transverse sectional view taken on line 14—14, Fig. 7.

As illustrated in Figs. 12, 13 and 14 of the drawings, the cam plate 206 comprises a horizontal central member 207 and a pair of vertical side members 208 extending longitudinally of the assembling machine in a relatively spaced parallel relationship. A cam track 211 which extends angularly upward towards the forward end of the assembling machine is provided in each of the side members 208 to receive a cam follower 212. A second cam follower 213 is provided which bears against a cam track 214 on the lower surface of the side members 208 of the cam plate 206. The cam followers 212 and 213 are adapted to be moved from lower to upper limit positions as the cam plate 206 is moved toward the rear of the assembling machine due to actuation of the cylinder 205. A pair of rollers 215 disposed directly above and below the forward end of the cam plate 206 and a second pair of rollers 216 disposed above and below the rear end of the cam plate 206 prevents relative vertical movement of the cam plate with respect to the assembling machine.

Figures 31, 31A:
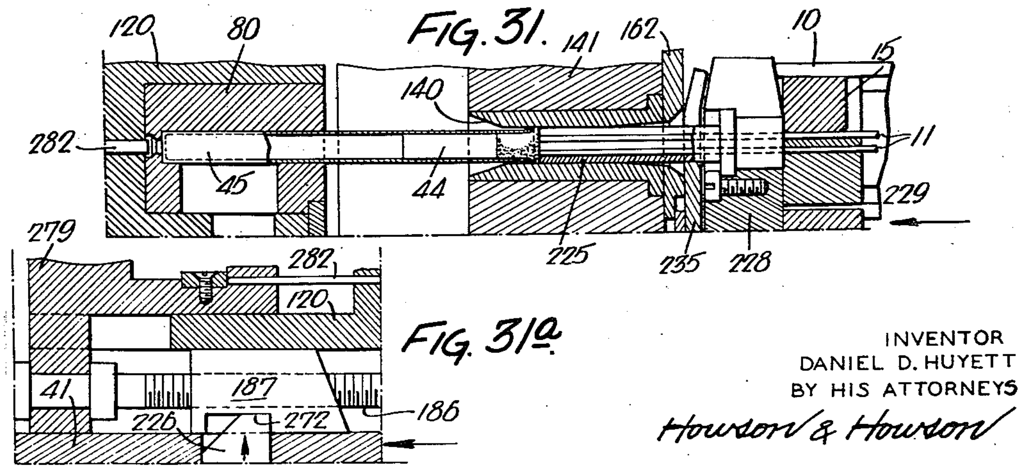

Simultaneously upon actuation of the cam plate 206 towards the rear of the machine, a switch operating member 217 carried by a rod 218 momentarily closes a micro-switch 219. The rod 218 is supported by a pair of brackets 221 depending downwardly from the piston rod 222 of the air cylinder 205. Actuation of the micro-switch 219 admits air to the upper end of the air cylinder 152 thus forcing the rack 153 downward disengaging the cams 159 from the upper surface at the face plate 162 and allowing the face plate to be returned to its upper limit position. This releases the plug and match assemblies and allows them to be freely moved in the funnels 140. At the same time the cam followers 212 raise a plurality of punches 225 into axial alignment with each of the funnels 140 as illustrated in Fig. 31. Furthermore, rearward movement of the cam plate 206 disengages the cam followers 213 from the cam track 214 and allows a pair of ejector latches 226, to extend upward into the path of the latch blocks 187 under pressure applied by the springs 227. The latches 226 are slidably supported in a bearing block **226*a* carried by the crosshead 41**.

Figure 15:
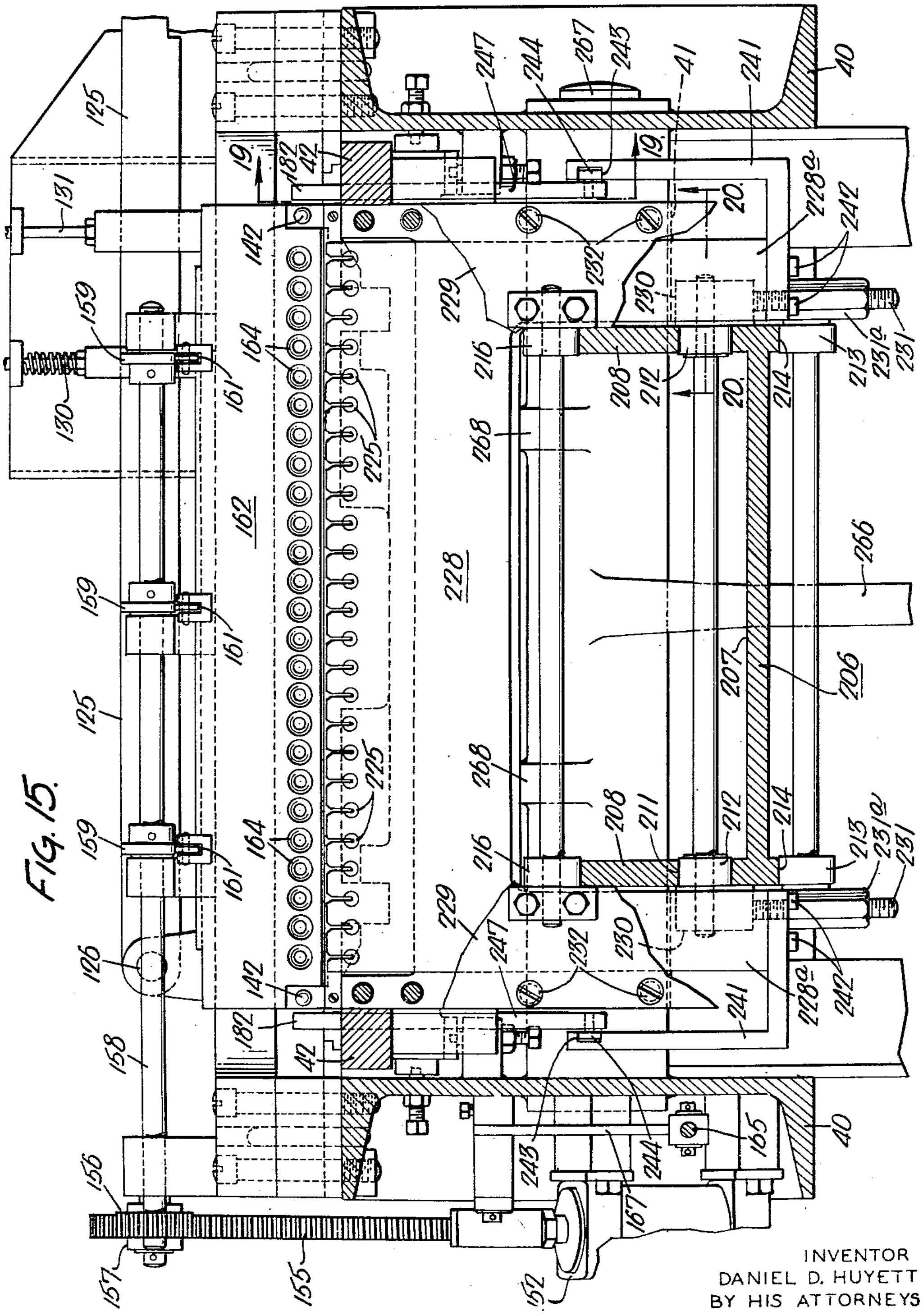
Fig. 15 is an enlarged transverse sectional view taken on line 15—15, Fig. 7.

With reference to Figs. 15 and 24 of the drawing, the punches 225 are carried by a punch plate 228 which is mounted for relative vertical movement with respect to the crosshead 41. The punch plate 228 is slidably mounted between the rear surface of the crosshead 41 and the forward surface of a backing up plate 229 which is held in a spaced parallel relationship with the rear surface of the crosshead 41 by means of cap screws 232. The punches 225 are raised to a position directly behind each of the plug and match assemblies and between the forward surface of the guide 15 and the rear surface of the face plate 162 of the funnels 140, and are operable to be moved forward to insert the plug and match assemblies into the shells. Accurate vertical adjustment of the punches 225 may be effected by means of bearing blocks 230 carried by the ends of the shaft supporting the cam followers 212. The blocks are adjustably secured to depending leg extensions **228*a* of the punch plate by adjusting screws 231 and lock nuts 231*a*** as illustrated in Figs. 8 and 15.

As illustrated in Fig. 24, the punches 225 are of generally cylindrical shape and have a vertical slot 233 extending longitudinally therein adapted to receive the wires 11 supporting the plug and match assemblies. Positioned at the forward end of the punches 225 and slidably mounted thereon is a face plate 235. A plurality of vertical pins 236 extend upwardly from the face plate 235 into openings 237 in the funnel block 141 as illustrated in Fig. 27. The pins 236 prevent relative longitudinal movement of the face plate 235 with respect to the funnels 140 and maintain the face plate 235 at all times in abutting relationship with the clamping plate 162. A plurality of openings 239 are provided in the face plate 235 through which the punches 225 pass. Thus the punches 225 cause vertical movement of the face plate 235 while at the same time, they may be moved longitudinally with respect to the face plate 235.

Figure 19:
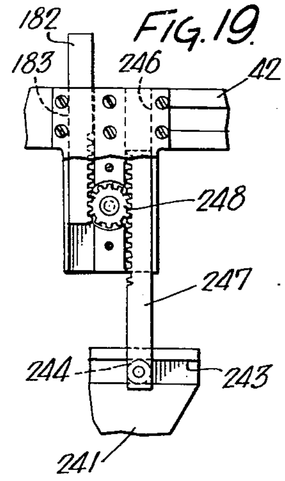
Fig. 19 is a fragmentary sectional view taken on line 19—19, Fig. 15.
Figure 20:
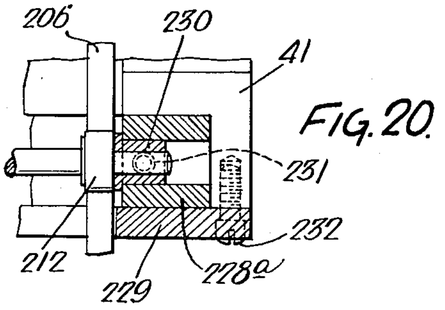
Fig. 20 is a fragmentary sectional view taken on line 20—20, Fig. 15.

Simultaneously upon raising the punch plate 228 a pair of brackets 241 (see Figs. 6 and 15) bolted to each side of the punch plate leg extensions **228*a* as indicated at 242 are also raised. The brackets 241 each have a horizontal cam track 243 therein adapted to engage a roller 244. Carried by each of the rollers 244 and extending upwardly therefrom through slots 246 in the side arms of the yoke 42 is a rack 247 disposed in spaced parallel relationship with the previously mentioned pins 182, as illustrated in Fig. 19. Positioned between the pins 182 and racks 247 and mounted in engaging relationship therewith is a pinion 248. Thus as the punches 225 are raised the pins 182 are lowered thereby allowing the guide 15 to bear against the rear surface of the punch plate 228. The horizontal cam track 243 permits relative longitudinal movement of the punches 225 with respect to the racks 247 and pins 182**.

During the downward stroke of the cylinder 152 unclamping the plug and match assemblies and allowing the same to be freely moved in the funnels 140 the rod 165 is actuated toward the rear of the assembling machine (see Fig. 2). This is accomplished by means of the bellcrank lever 167 as previously described. The rod 165 carries a switch actuating member 261 operable to momentarily close a micro-switch 262 during its rearward stroke.

Actuation of the micro-switch 262 admits air to the forward end of an air cylinder 263 as illustrated in Fig. 6 thereby causing its piston rod 264 to be moved toward the rear of the assembling machine. The air cylinder 263 operates to bring the crosshead 41 and thus the punches 225 toward the forward end of the assembling machine. As the punches 225 are actuated in a forward direction they insert the plug and match assemblies into the loaded shells as illustrated in Fig. 31.

Carried on the forward end of the piston rod 264 of the air cylinder 263 is a yoke 265. The yoke 265 has the lower end of a lever 266 pivotally mounted therein. Extending transversely of the assembling machine is a shaft 267 on which the lever 266 is pivotally mounted and actuation of the air cylinder 263 operates to pivot the lever 266 about the shaft 267. The upper end of the lever 266 has a pair of arms 268 thereon which are pivotally mounted in blocks 269 positioned in openings 270 in the crosshead 41 as illustrated in Figs. 7 and 24. Air is thus admitted to the forward end of the air cylinder 263 to pivot the lever 266 in a counterclockwise direction about the shaft 267 and actuate the crosshead 41 toward the forward end of the assembling machine.

As the crosshead 41 is moved towards the forward end of the assembling machine the punches 225 are moved in a like manner and bear against the end of the plug and match assemblies and insert the same into the loaded shells. At the same time the latches 226 which are also carried by the crosshead 41 are moved towards the forward end of the machine and at the extreme forward position of the crosshead 41 are positioned directly beneath the latch blocks 187 as illustrated in Fig. 31*a*. Since during this phase of the operation the latches 226 are in the path of the latch blocks 187, the springs 227 force the latches 226 into openings 272 in the lower surface of the latch blocks 187.

Simultaneously upon actuation of the crosshead 41 to its extreme forward limit position, a switch operating member 274 contacts a micro-switch 275 which admits air to the rear end of the air cylinder 263 and actuates the crosshead 41 towards the rear of the assembling machine. The switch operating member 274 is carried at the end of a rod 276 extending longitudinally of the assembling machine and operated by means of a bracket 277 extending upwardly from the yoke 265.

During the forward stroke of the air cylinder 263 which moves the crosshead 41 toward the rear of the assembling machine, the punches 225 are withdrawn from the funnels 140. At the same time the ejector latches 226 pull the latch blocks 187 towards the rear of the assembling machine. The latch blocks 187 are fixedly secured to an ejector pin plate 279 by means of a pair of collars 280 carried by the adjusting screws 186. The ejector pin plate 279 is normally held in an extreme forward position with respect to the carriage 120 by means of a pair of springs 281 bearing against and reacting on the rear surface of the ejector pin plate 279 and the forward surface of the carrier 120 as illustrated in Figs. 1 and 8. Extending outwardly from the ejector pin plate 279 are a plurality of ejector pins 282 which pass through openings 283 in the carriage 120 and normally are positioned adjacent the rear surface of the cap holder 80. As the ejector pin plate 279 is brought towards the rear of the assembling machine the ejector pins 282 bear against the end of the shells 45 and force the same out of the holder 80 and through the funnels 140.

During the end of the forward stroke of the air cylinder 263 a switch operating member 284 carried by the rod 276 momentarily closes a micro-switch 285 which admits air to the rear end of the air cylinder 205 which in turn forces the cam plate 206 towards the forward end of the assembling machine. During the forward stroke of the cam plate 206 the punches 225 are pulled downward and out of the path of the loaded shells 45 by means of the cam track 211 and the latches 226 are withdrawn from engagement with the latch blocks 187 by means of the cam track 214. Disengagement of the latches 226 from the latch blocks 187 permits the springs 281 to force the ejector pin plate 279 forward with respect to the carriage 120 and withdraw the ejector pins 282 from engagement with the end of the shells 45. A pair of dash-pots **279*a*, 279*a* carried by the ejector pin plate 279 soften the return stroke of the plate 279**.

As the punches descend the pins 182 are elevated, as previously described, to hold the guide 15 in its rearward position until the yoke 42 moves forward. This construction restrains the spring actuated return of the guide 15 to the regulated speed of the yoke 42 as the guide 15 moves forward against the plugged caps.

Simultaneously, upon actuation of the air cylinder 205, the rod 218 supported by brackets 221 depending downwardly from the piston rod 222 and of the air cylinder 205 is moved towards the forward end of the machine. A switch operating member 287 carried by the rod 218 momentarily closes a micro-switch 288 which operates to admit air to the upper end of the air cylinder 169. Admittance of air to the upper end of the air cylinder 169 pivots the toggle 173 in a clockwise direction about the shaft 174 and moves the yoke 42 towards the forward end of the assembling machine. This returns the carriage 120 to its original position and allows a new cap holder to be inserted therein.

Simultaneously, upon actuation of the yoke 42 towards the forward end of the machine a switch operating member 290 contacts a micro-switch 291 which is operable to admit air to the forward end of the air cylinder 76. Admittance of air to the forward end of the air cylinder 76 moves the feed table 43 supporting the tray 10 toward the rear of the assembling machine as previously described, and, at the same time, withdraws the shell assemblies from the funnels 140. As the feed table is withdrawn, the micro-switch 149 is closed as previously described, thus raising the barricade. This completes the operation of the assembling machine and the machine is now ready for a second sequence of operations with another cap holder carrying a plurality of loaded shells and a second wire tray supporting a plurality of plug and match assemblies.

Fig. 46 is a schematic diagram illustrating the electrical and pneumatic controls for the assembling machine. All of the double acting air cylinders are controlled by a pair of solenoid operated valves which admit air to the cylinders. The cylinders and switches illustrated in Fig. 46 are shown in their position at the end of an assembling operation.

As a wire tray 10 is inserted into the assembling machine, a micro-switch 68 is momentarily closed. The microswitch 68 actuates a valve assembly 301 by means of a relay assembly 302. The valve assembly 301 is operable to admit air to the forward or rearward end of a cylinder 71 and closing the switch 68 admits air to the forward end of the cylinder 71, thereby bringing the locking plate forward as previously described. The valve assembly 301 consists of a pair of valves 303 and 304 operated by means of a walking beam 305 pivotally mounted at its mid-point and positioned by a pair of solenoids 306 and 307. Relays 308 and 309 deenergize the solenoids 306 and 307. The relays 308 and 309 are actuated by relay coils 312 and 313 respectively.

Closing the switch 68 momentarily completes the circuit to the relay coil 312 and raises the relay 308. Energizing the relay coil 312 breaks the circuit through contacts 314 and 315, and completes a circuit through contacts 316 and 317. Opening the circuit between contacts 314 and 315 breaks the holding circuit for the relay coil 313 allowing the relay 309 to drop and thereby close the holding circuit for the relay coil 312 through contacts 318 and 319 and maintain the relay 308 energized after the switch 68 is open. The holding circuit for the relay 308 is from a buss 322 at one side of the line through the relay coil 312, then through conductors 323 and 324, contacts 319 and 318, and through conductor 325 to a buss 326 at the other side of the line. When the relay 308 is in its upper position, the circuit to the solenoid 306 is completed through the buss 322 at one side of the line, conductor 327, contacts 316 and 317, conductor 328, the solenoid 306, and then through a conductor 329 to the buss 326 at the other side of the line.

Energizing the solenoid 306 causes the walking beam 305 to be pivoted about its mid-point in a counter-clockwise direction thereby opening the valve 303 permitting air to be admitted to the forward end of the cylinder 71 and closing valve 304 allowing the air in the rear end of the cylinder 71 to be exhausted to the atmosphere. The locking plate is thereby forced forward locking the tray 10 in position on a feed table 43 and at the same time closing the switch 75.

As previously described after a holder 80 supporting a plurality of loaded shells is properly positioned in the assembling machine, the micro-switches 99, 131 and 132 are closed. Closing the manually operated switch 106 now energizes a relay assembly 332 similar to the above-mentioned relay assembly 302 which in turn actuates a valve assembly 333 similar to the above-mentioned valve assembly 301 thereby admitting air to the lower end of the air cylinder 112 and closing the barricade. As the barricade is lowered the micro-switch 135, which is in series with the micro-switches 75, 131 and 132 is closed thereby completing a circuit to a relay assembly 334 which in turn actuates a valve assembly 335. The valve assembly 335 is actuated at this time to admit air to the rear end of the cylinder 76 which is operable to bring the feed table 43 forward and insert the plug and match assemblies in the funnels 140.

As previously described a pause is provided in the operation of the assembling machine at this time in order to determine whether or not the plug and match assemblies are properly entered into the funnels 140. If the plug and match assemblies are not properly entered in the funnels 140, closing the manually operated switch 148 will energize the relay assembly 334 in such a manner as to cause the valve assembly 335 to be operated to admit air to the forward end of the cylinder 76 thereby withdrawing the plug and match assemblies from the funnels.

At the same time the switch 149 is momentarily closed energizing the relay assembly 332 in such a manner to cause the valve assembly 333 to admit air to the upper end of the cylinder 112 and raise the barricade thus allowing the operator of the machine to properly align the plug and match assemblies with the funnels. After the plug and match assemblies are in proper alignment with the funnels, closing the switch 106 will cause the barricade to be lowered and also cause the feed table 43 to be moved forward inserting the plug and match assemblies into the funnels.

In order to complete the operating cycle of the assembling machine, the operator of the machine closes the manually operated switch 151. Closing the manually operated switch 151 energizes a relay assembly 336 which operates a valve assembly 337 thereby admitting air to the lower end of the air cylinder 152. At the same time, the relay coil 313 is energized which raises the relay 309 opening the holding circuit for the relay coil 312 through contacts 318 and 319, and closing a circuit through contacts 338 and 339.

When the holding circuit for the relay coil 312 is broken, the relay 308 drops downward opening the circuit through contacts 316 and 317 and closing the holding circuit for the relay coil 313 through contacts 314 and 315. The holding circuit for the relay coil 313 is from the buss 322 at one side of the line, through coil 313, through conductors 342 and 343, through the contacts 314 and 315, and conductor 325 to the buss 326 at the other side of the line. Energizing the relay coil 313 operates to energize the solenoid 307 thereby rotating the walking beam 305 about its mid-point in a clockwise direction admitting air to the rear end of the air cylinder 71 and withdrawing the locking plate.

The circuit for the solenoid 307 is from the buss 322 at one side of the line, through conductor 327, contacts 338 and 339, conductor 344, solenoid 307, and through conductor 345 to the buss 326 at the other side of the line. After the switch 151 is closed, the remaining cylinders 169, 205 and 263 are operated by means of valve assemblies 350, 351 and 352 respectively which in turn are actuated by relay assemblies 353, 354 and 355 respectively, and the capping operation is completed as previously described. The relay and valve assemblies may all be included in a single bank as indicated at 356 in Fig. 5.

Figs. 27 to 35 inclusive illustrate the various steps in the assembling operation of the machine which now will be briefly summarized. The plug and match assemblies in the tray 10 are inserted into the funnels 140 as shown in Fig. 27 by actuation of the table 43, and the clamping plate 162 is lowered by means of the cams 159 to the position shown in Fig. 28 thereby to securely hold the plug and match assemblies in the funnels 140. The loaded shells 45 then are inserted into the opposite end of the funnels 140 by actuation of carriage 120 and the pins 182 are moved towards the rear of the machine thereby forcing the guide 15 backwards to the position shown in Fig. 29.

The punches 225 then are raised to a position in axial alignment with each of the plug and match assemblies and the ejector latches 226 are resiliently urged upward in the path of the latch blocks 187 by means of the springs 227, after which the clamping plate 162 is returned to its normal position releasing the plug and match assemblies and allowing the same to be moved freely in the funnels 140. This phase of the operation is illustrated in Figs. 30 and 30*a*.

The punches 225 are then brought towards the forward end of the assembling machine to insert the plug and match assemblies into the loaded shells and allow the ejector pins to engage the latch blocks 187 as shown in Figs. 31 and 31*a*. The crosshead 41 then moves towards the rear of the machine withdrawing the punches 225 from the funnels 140 and at the same time draws the ejector pins 282 towards the rear of the assembling machine, thereby forcing the loaded shells out of the holder 80 and forcing the enlarged forward end of the loaded detonator shells free of the restricted throat openings in the funnels 140, to the position shown in Fig. 32.

Figures 32, 33, 34, 35:
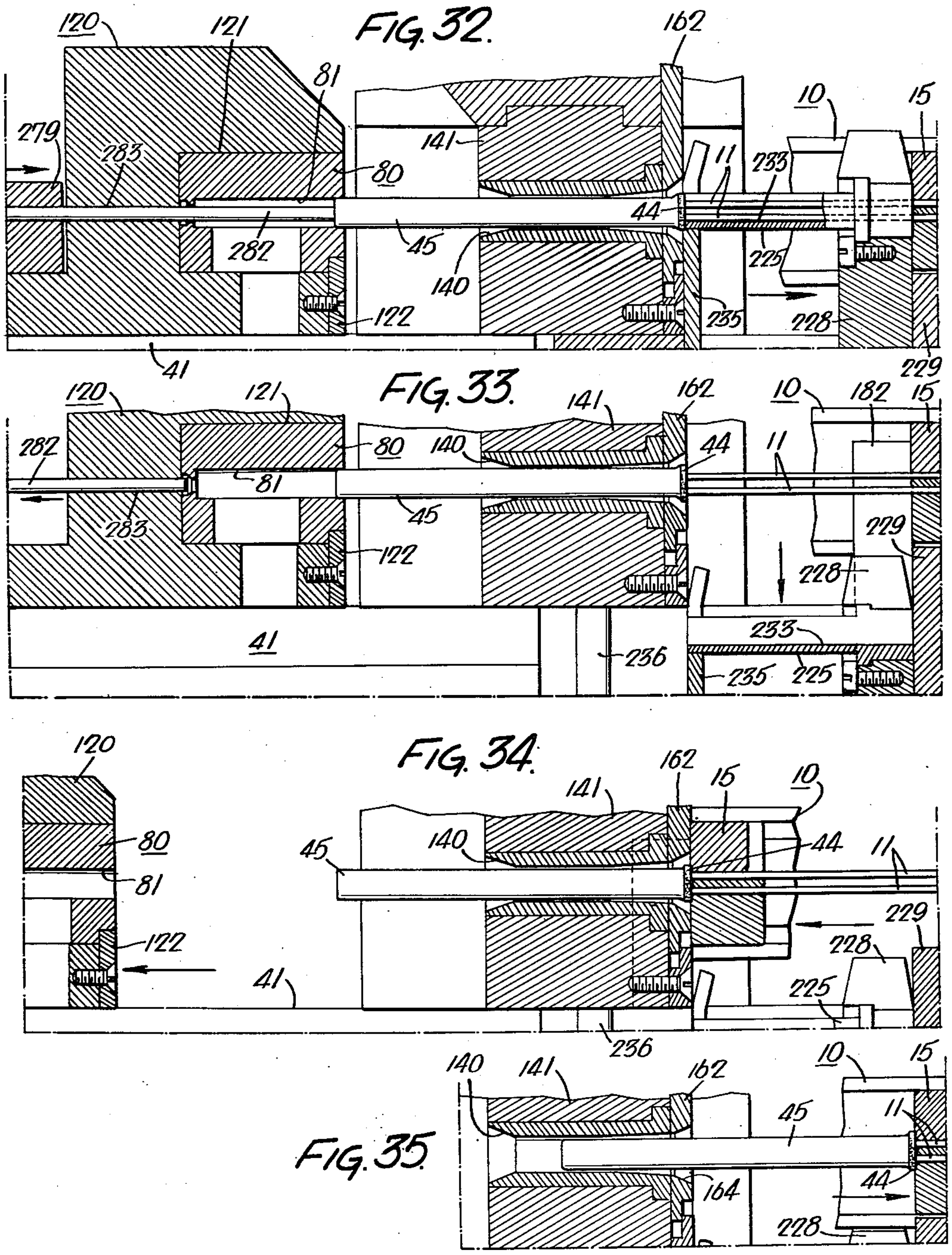

The final sequence of operations is shown in Figs. 33, 34 and 35 wherein the punches 225 are lowered, the ejector pins 282 are returned to their original forward position, and the pins 132 are moved towards their forward position thereby causing the guide 15 to bear against the rear surface of the clamping plate 162. The feed table 43 is then moved towards the rear of the machine and the loaded shells in which the plug and match assemblies are inserted are withdrawn from the funnels 140 to complete the assembling operation.

From the foregoing, it will be observed that the present invention provides a novel assembling machine which is entirely automatic in operation and which will simultaneously insert a plurality of preformed plug and electric match assemblies into a plurality of loaded shells quickly and uniformly. Furthermore, the present invention provides a novel assembling machine which may be used as a single station in a production line for the manufacture of electric blasting caps or the like thereby reducing considerably the amount of time and labor needed for the manufacture of electric blasting caps.

While certain embodiments of the present invention have been illustrated and described herein, it is not intended to limit the invention to such disclosures and changes and modifications may be incorporated and embodied therein within the scope of the following claims.

I claim:

1. In a machine to insert a plurality of plug assemblies simultaneously into the open ends of a corresponding number of electric initiator shells, a member having a plurality of openings extending therethrough, mechanism including a movable support to support a plurality of plug assemblies at one side of said member in alignment with the openings therein and actuable to insert said plug assemblies partially into the openings in said member, mechanism including a second movable support to support a corresponding number of open ended electric initiator shells at the other side of the member in alignment with the openings therein and actuable to advance the shells and insert the open ends thereof in the openings in the member, including a plate slidably mounted adjacent said one side of the member and displaceable between a first position in the path of movement of said plug match assembly and a second position out of said path, means to displace said plate into said first position to engage and hold the plug assemblies in the position to which actuated in said member, means to withdraw said plug assembly support, means to displace said plate to said second position, and plugging mechanism including a member engaging and supporting the plug assembly upon displacement of said plate to the second position, said mechanism being operable to effect relative positioning movements of the plug assemblies and shells with respect to each other in the member to cause the plug assemblies to be inserted into the open ends of the shells.

2. In a machine to insert a plurality of plug assemblies into the open ends of a corresponding number of electric initiator shells, a member having a plurality of openings therethrough, feed mechanisms including a pair of movable supports for the plug assemblies and shells operable in predetermined sequence to insert corresponding pluralities of plug assemblies and electric initiator shells into the opposite ends respectively of the openings in said member, a plurality of plungers corresponding in number to the plug assemblies normally offset with respect to the axes of the plug assemblies and member openings, and means operable to initiate actuation of the plungers as a group into axial alignment with said plug assemblies and toward said members to engage the plug assemblies and force the same axially into the open ends of said shells.

3. In a machine to insert a plurality of plug assemblies into the open ends of a corresponding number of electric initiator shells, a member having a plurality of openings therethrough, feed mechanisms including a pair of movable supports for the plug assemblies and shells operable to insert corresponding pluralities of plug assemblies and electric initiator shells into the opposite ends respectively of the openings in said member, a plurality of plungers corresponding in number to the plug assemblies normally offset with respect to the axes of the plug assemblies and member openings, means including a bracket supporting said plungers operable to position said plungers simultaneously with their axes coincident with the axes of said plug assemblies, and mechanism operable to initiate actuation of the plungers as a group in an axial direction to engage the plug assemblies and force the same axially into the open ends of said shells.

4. In a machine to insert a plurality of plug assemblies into the open ends of a corresponding number of electric initiator shells, a member having a plurality of openings therethrough, feed mechanisms including a pair of movable supports for the plug assemblies and shells operable in predetermined sequence to insert corresponding pluralities of plug assemblies and electric initiator shells into the opposite ends respectively of the openings in said member, a plurality of plungers corresponding in number to the plug assemblies normally offset with respect to the axes of the plug assemblies and member openings, a support for said plungers, cam means engageable with said plunger support operable to position said plungers simultaneously with their axes coincident with the axes of said plug assemblies, and a member movable with the cam means to initiate actuation of the plungers as a group in an axial direction to engage the plug assemblies and force the same axially into the open ends of said shells.

5. In a machine to insert a plurality of plug assemblies into the open ends of a corresponding number of electric initiator shells, a member having a plurality of openings therethrough, feed mechanisms including a pair of movable supports for the plug assemblies and shells operable to insert corresponding pluralities of plug assemblies and electric initiator shells into the opposite ends respectively of the openings in said member, gripping means to engage the plug assemblies and retain the same in the position in the openings to which actuated, a plurality of plungers corresponding in number to the plug assemblies normally offset with respect to the axes of the plug assemblies and member openings, a support member for said plungers, means operable to engage said plunger support and position said plungers simultaneously with their axes coincident with the axes of said plug assemblies, means to release said gripping means, and means operable to engage said support member and initiate actuation of the plungers as a group in an axial direction to engage the plug assemblies and force the same axially into the open ends of said shells.

6. In a machine to insert a plurality of plug assemblies into the open ends of a corresponding number of electric initiator shells, a member having a plurality of openings therethrough, feed mechanisms including a pair of movable supports for the plug assemblies and shells operable in predetermined sequence to insert corresponding pluralities of plug assemblies and electric initiator shells into the opposite ends respectively of the openings in said member, gripping means including a slidable plate adjacent one side of the member to engage the plug assemblies and retain the same in the position in the openings to which actuated, a plurality of plungers corresponding in number to the plug assemblies normally offset with respect to the axes of the plug assemblies and member openings, a support member for the plungers, means operable to engage said support member and position said plungers simultaneously with their axes coincident with the axes of said plug assemblies, means operable upon positioning of said plungers to actuate said plate out of engagement with the plugs, and mechanism operable to engage said plunger support and initiate actuation of the plungers as a group in an axial direction to engage the plug assemblies and force the same axially into the open ends of said shells.

7. In a machine to insert a plurality of plug assemblies into the open ends of a corresponding number of electric initiator shells, a member having a plurality of openings therethrough, feed mechanisms including a pair of movable supports for the plug assemblies and shells operable in predetermined sequence to insert corresponding pluralities of plug assemblies and electric initiator shells into the opposite ends respectively of the openings in said member, gripping means including a plate slidably mounted adjacent said member to engage the plug assemblies and retain the same in the position in the openings to which actuated, a plurality of plungers corresponding in number to the plug assemblies normally offset with respect to the axes of the plug assemblies and member openings, a support for said plungers, cam means in engagement with said plunger support operable to position said plungers simultaneously with their axes coincident with the axes of said plug assemblies, a member movable with the cam means operable upon positioning of said plungers to actuate said plate out of engagement with the plugs to release said gripping means, a second member in engagement with said plunger support movable with the cam means to initiate actuation of the plungers as a group in an axial direction to engage the plug assemblies and force the same axially into the open ends of said shells, and means to actuate the plug feed mechanism in a reverse direction to withdraw the plugged shells from the openings.

8. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, mechanism to advance the shell support and insert the open end of said shells into the other ends of the member openings, a plurality of plungers corresponding in number to the plug assemblies, a support for said plungers, mechanism operable to engage said plunger support and actuate the plungers as a group in an axial direction to engage the plug assemblies and force the same axially into the open ends of said shells, and means to actuate the plug feed mechanism in the reverse direction to withdraw the plugged electric initiator shells from the member and position the same on said plug assembly support.

9. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, mechanism to advance the shell support and insert the open end of said shells into the other ends of the member openings, a plurality of plungers corresponding in number to the plug assemblies normally offset with respect to the axes of the plug assemblies and member openings, a support for said plungers, means operable to engage said plunger support and position said plungers simultaneously with their axes coincident with the axes of said plug assemblies, and mechanism operable to actuate the plunger support and the plungers as a group in an axial direction to engage the plug assemblies and force the same axially into the open ends of said shells.

10. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies partially into the openings in said member, a support at the other side of the member for a corresponding number of open ended electric initiator shells in alignment with the openings in said member, mechanism to advance the shell support and insert the open end of said shells into the other ends of the member openings, gripping means including a sliding plate adjacent one side of said member to engage said plug assemblies and retain the same in the position in the member openings to which actuated, means to withdraw said plug assembly support, a plurality of plungers corresponding in number to the plug assemblies, a support for said plungers, means to actuate said sliding plate out of engagement with said plugs and thereby release said gripping means, and mechanism operable in timed relation to the release of said gripping means to engage said plunger support and actuate the plungers as a group in an axial direction to engage and support the plug assemblies and force the same axially into the open ends of said shells.

11. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies partially into the openings in said member, a support at the other side of the member for a corresponding number of open ended electric initiator shells in alignment with the openings in said member, mechanism to advance the shell support and insert the open end of said shells into the other ends of the member openings, gripping means including a sliding plate adjacent one side of said member to engage said plug assemblies and retain the same in the position in the member openings to which atcuated, a plurality of plungers corresponding in number to the plug assemblies normally offset with respect to the axes of the plug assemblies and member openings, a support for said plungers, means operable to engage said plunger support and position said plungers simultaneously with their axes coincident with the axes of said plug assemblies, means operable upon the positioning of said plungers to actuate said plate out of engagement with the plugs to release said gripping means, and mechanism operable in timed relation to the release of said gripping means to actuate the plunger support and the plungers as a group in an axial direction to engage the plug assemblies and force the same axially into the open ends of said shells.

12. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies partially into the openings in said member, a support at the other side of the member for a corresponding number of open ended electric initiator shells in alignment with the openings in said member, mechanism to advance the shell support and insert the open end of said shells into the other ends of the member openings, gripping means to engage said plug assemblies and retain the same in the position in the member openings to which actuated, a plurality of plungers corresponding in number to the plug assemblies normally offset with respect to the axes of the plug assemblies and member openings, a support for said plungers, means operable to engage said plunger support and position said plungers simultaneously with their axes coincident with the axes of said plug assemblies, means operable upon the positioning of said plungers to release said gripping means, mechanism operable in timed relation to the release of said gripping means to actuate the plunger support and the plungers as a group in an axial direction to engage the plug assemblies and force the same axially into the open ends of said shells, and means to actuate the plug feed mechanism in the reverse direction to withdraw the plugged shells from the member.

13. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, mechanism to advance the shell support and insert the open end of said shells into the other ends of the member openings, a plurality of plungers corresponding in number to the plug assemblies normally offset with respect to the axes of the plug assemblies and member openings, a support for said plungers, cam means in engagement with said plunger support and operable to position said plungers simultaneously with their axes coincident with the axes of said plug assemblies, and mechanism operable by said cam means to initiate actuation of the plunger support and of the plungers as a group in an axial direction to engage the plug assemblies and force the same axially into the open ends of said shells.

14. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies partially into the openings in said member, a support at the other side of the member for a corresponding number of open ended electric initiator shells in alignment with the openings in said member, mechanism to advance the shell support and insert the open end of said shells into the other ends of the member openings, gripping means including a sliding plate mounted adjacent said member to engage said plug assemblies and retain the same in the position in the member openings to which actuated, a plurality of plungers corresponding in number to the plug assemblies normally offset with respect to the axes of the plug assemblies and member openings, a support for said plungers, cam means in engagement with said plunger support operable to position said plungers simultaneously with their axes coincident with the axes of said plug assemblies, a member movable with the cam means operable upon positioning of said plungers to actuate said sliding plate out of engagement with the plugs to thereby release said gripping means, a second member movable with the cam means to initiate actuation of the plunger support and of the plungers as a group in an axial direction to engage the plug assemblies and force the same axially into the open ends of said shells.

15. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, mechanism to advance the shell support and insert the open end of said shells into the other ends of the member openings, a plurality of plungers corresponding in number to the plug assemblies normally offset with respect to the axes of the plug assemblies and member openings, a support for said plungers, cam means in engagement with said plunger support operable to position said plungers simultaneously with their axes coincident with the axes of said plug assemblies, mechanism operable by said cam means to initiate actuation of the plunger support and of the plungers as a group in an axial direction to engage the plug assemblies and force the same axially into the open ends of said shells, and means to actuate the plug feed mechanism in a reverse direction to withdraw the plugged electric initiator shells from the openings.

16. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, a plurality of ejector pins corresponding in number to the member openings carried by the shell support in axial alignment with said openings and actuatable to eject the shells from the shell support, mechanism to advance the shell support and insert the open end of said shells into the other ends of the member openings, a plurality of plungers corresponding in number to the plug assemblies, a support for said plungers, mechanism operable to engage said plunger support and to actuate the plungers as a group in an axial direction to engage the plug assemblies and force the same axially into the open ends of said shells and then in a reverse direction to withdraw the plungers from the openings, and means acting upon reverse actuation of the plunger mechanism to actuate said ejector pins in the corresponding axial direction to eject the plugged electric initiator shells from the shell support, and engage the same upon said plug assembly support.

17. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, a plurality of ejector pins corresponding in number to the member openings carried by the shell support in axial alignment with said openings and actuable to eject the shells from the shell support and said openings, mechanism to advance the shell support and insert the open end of said shells into the other ends of the member openings, gripping means including a sliding plate adjacent said member operable to engage said plug assemblies and retain the same in the position in the member openings to which actuated, means to retract said plug assembly support, a plurality of plungers corresponding in number to the plug assemblies and positionable to engage and support the same, a support for said plungers, mechanism operable to engage said plunger support to actuate the plungers as a group in an axial direction to engage the plug assemblies and force the same axially into the open ends of said shells and then in a reverse direction to withdraw the plungers from the openings, means operable prior to actuation of said plungers to actuate said sliding plate out of engagement with the plugs to thereby release said gripping means, and means acting upon reverse actuation of the plug feed mechanism to actuate said ejector pins in the corresponding axial direction to eject the plugged electric initiator shells from the shell support, and engage the same upon said plug assembly support.

18. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, mechanism to advance the shell support and insert the open end of said shells into the other ends of the member openings, a plurality of plungers corresponding in number to the plug assemblies normally offset with respect to the axes of the plug assemblies and member openings, a support for said plungers, means to engage said plunger support and position said plungers simultaneously with their axes coincident with the axes of said plug assemblies, mechanism engageable with the plunger support operable to actuate the plungers as a group in an axial direction to engage the plug assemblies and force the same axially into the open ends of said shells, and control means associated with said shell support including a switch member actuatable by the shells and operable to prevent operation of the machine if the shells are not properly positioned on the shell support.

19. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, mechanism to advance the shell support and insert the open end of said shells into the other ends of the member openings, gripping means including a sliding plate adjacent said member to engage the plug assemblies and retain the same in the position in the member openings to which actuated, a plurality of plungers corresponding in number to the plug assemblies normally offset with respect to the axes of the plug assemblies and member openings, a support for said plungers, means in engagement with said plunger support to position said plungers simultaneously with their axes coincident with the axes of said plug assemblies, a member operable upon positioning of said plungers to actuate said sliding plate out of engagement with the plugs to thereby release said gripping means, mechanism to actuate the plungers as a group in an axial direction to engage the plug assemblies and force the same axially into the open ends of said shells, and control means associated with said shell support including a switch member actuatable by the shells and operable to prevent operation of the machine if the shells are not properly positioned on the shell support.

20. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a plurality of ejector pins corresponding in number to the member openings carried by the shell support in axial alignment with said openings and actuable to eject the shells from the shell support, mechanism to advance the shell support and insert the open end of said shells into the other ends of the member openings, a plurality of plungers corresponding in number to the plug assemblies, a support member for said plungers, mechanism in engagement with said plunger support to actuate the plungers as a group in an axial direction to engage the plug assemblies and force the same axially into the open ends of said shells, control means associated with said shell support including a switch member actuatable by the shells and operable to prevent operation of the machine if the shells are not properly positioned on the shell support, means to actuate the plunger mechanism in a reverse direction to withdraw the plungers from the openings, and means acting upon reverse actuation of the plunger mechanism to actuate said ejector pins in the corresponding axial direction to eject the plugged shells from the shell support, and engage the same upon said plug assembly support.

21. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, a plurality of ejector pins corresponding in number to the member openings carried by the shell support in axial alignment with said openings and actuable to eject the shells from the shell support, mechanism to advance the shell support and insert the open end of said shells into the other ends of the member openings, gripping means including a sliding plate adjacent said member to engage said plug assemblies and retain the same in the position in the member openings to which actuated, a plurality of plungers corresponding in number to the plug assemblies, a support for said plungers, mechanism engageable with said plunger support to actuate the plungers as a group in an axial direction to engage the plug assemblies and force the same axially into the open ends of said shells, means operable prior to actuation of said plungers to actuate said sliding plate out of engagement with the plugs and thereby release said gripping means, control means associated with said shell support including a switch member actuatable by the shells and operable to prevent operation of the machine if the shells are not properly positioned on the shell support, means to actuate the plunger mechanism in a reverse direction to withdraw the plungers from the openings, and means acting upon reverse actuation of the plunger mechanism to actuate said ejector pins in the corresponding axial direction to eject the plugged shells from the shell support, and engage the same upon said plug assembly support.

22. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, a plurality of ejector pins corresponding in number to the member openings carried by the shell support in axial alignment with said openings and actuable to eject the shells from the shell support, mechanism to advance the shell support and insert the open end of said shells into the other ends of the member openings, a plurality of plungers corresponding in number to the plug assemblies, a support for said plungers, mechanism in engagement with said plunger support operable to actuate the plungers as a group in an axial direction to engage the plug assemblies and force the same axially into the open ends of said shells, control means associated with said shell support including a switch member actuatable by the shells and operable to prevent operation of the machine if the shells are not properly positioned on the shell support, and means operable after actuation of the plunger mechanism to actuate said ejector pins to eject the plugged shells from the shell support, and engage the same upon said plug assembly support.

23. In a machine to insert a plurality of plug assemblies simultaneously into the open ends of a corresponding number of electric initiator shells, a member having a plurality of openings extending therethrough, feed mechanism to support a plurality of plug assemblies at one side of said member in alignment with the openings therein and actuable to insert said plug assemblies partially into the openings in said member, mechanism to support a corresponding number of open ended electric initiator shells at the other side of the member in alignment with the openings therein and actuable after actuation of the plug feed mechanism to advance the shells and insert the open ends thereof in the openings in the member, after insertion of the plug assemblies into said openings, means including a sliding plate adjacent said one side of said member operable to engage and hold the plug assemblies in the positions to which actuated in said member, means to retract said plug mechanism, plugging mechanism including members operable upon retraction of said plug feed mechanism to engage and support said plug assemblies, said mechanism operable to effect relative positioning movements of the plug assemblies and shells with respect to each other in the member to cause the plug assemblies to be inserted into the open ends of the shells, mechanism to actuate said sliding plate out of engagement with the plugs and thereby release the holding means on the plug assemblies just prior to operation of the plugging mechanism, and control means to prevent operation of the machine if the plug assemblies are not properly positioned thereon.

24. In a machine to insert a plurality of plug assemblies into the open ends of a corresponding number of electric initiator shells, a member having a plurality of openings therethrough, feed mechanisms operable in predetermined sequence to insert corresponding pluralities of plug assemblies and electric initiator shells into the opposite ends respectively of the openings in said member, gripping means including a sliding plate adjacent one side of said member to engage the plug assemblies and retain the same in the position in the openings to which actuated, a plurality of plungers corresponding in number to the plug assemblies normally offset with respect to the axes coincident with the axes of said plug assemblies, a support for said plungers, cam means in engagement with said plunger support operable to actuate said plungers into a position in axial alignment with the plug assemblies, a member movable with the cam means operable upon positioning of said plungers to actuate said sliding plate out of engagement with said plugs and thereby release said gripping means, a second member movable with the cam means to initiate actuation of the plungers as a group in an axial direction to engage the plug assemblies and force the same axially into the open ends of said shells, means to actuate the plug feed mechanism in a reverse direction to withdraw the plugged shells from the openings, and control means to prevent further operation of the machine until after the plugged shells are removed therefrom.

25. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies partially into the openings in said member, control mechanism associated with said feed mechanism actuable to stop operation of the machine after actuation of said plug feed mechanism, a support at the other side of the member for a corresponding number of open ended electric initiator shells in alignment with the openings in said member, mechanism to advance the shell support and insert the open end of said shells into the other ends of the member openings, gripping means including a sliding plate adjacent said one side of said member operable to engage said plug assemblies and retain the same in the position in the member openings to which actuated, a plurality of plungers corresponding in number to the plug assemblies normally offset with respect to the axes of the plug assemblies and member openings, means operable to position said plungers simultaneously with their axes coincident with the axes of said plug assemblies, a support for said plungers, means in engagement with said plunger support operable upon the positioning of said plungers to release said gripping means, and mechanism operable in timed relation to the release of said gripping means to actuate said sliding plate out of engagement with said plugs thereby to actuate the plungers as a group in an axial direction to engage the plug assemblies and force the same axially into the open ends of said shells.

26. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, a plurality of ejector pins corresponding in number to the member openings carried by the shell support in axial alignment with said openings and actuable to eject the shells from the shell support, mechanism to advance the shell support and insert the open end of said shells into the other ends of the member openings, a plurality of plungers corresponding in number to the plug assemblies normally offset with respect to the axes of the plug assemblies and member openings, a support for said plunger, cam means in engagement with said plunger support operable to position said plungers simultaneously with their axes coincident with the axes of said plug assemblies, means in engagement with said plunger support to initiate actuation of the plungers as a group in an axial direction to engage the plug assemblies and force the same axially into the open ends of said shells, control means associated with said shell support including a switch member actuatable by the shells and operable to prevent operation of the machine if the shells are not properly positioned on the shell support, means to actuate the plunger mechanism in a reverse direction to withdraw the plungers from the openings, and means in engagement with said plunger support and said ejector pins acting upon reverse actuation of the plunger mechanism to actuate said ejector pins in the corresponding axial direction to eject the shells from the shell support.

27. In a machine to insert a plurality of plug assemblies simultaneously into the open end of a like number of electric initiator shells, a member having a plurality of openings extending therethrough, a support at one side of said member to support plug assemblies in alignment with said openings in the member, feed mechanism to advance said support and insert said plug assemblies into the openings in said member, a support at the other side of the member for a corresponding number of open ended electric initiator shells in alignment with the openings in said member, a plurality of ejector pins corresponding in number to the member openings carried by the shell support in axial alignment with said openings and actuable to eject the shells from the shell support, mechanism to advance the shell support and insert the open end of said shells into the other ends of the member openings, gripping means including a sliding plate mounted adjacent said member operable to engage said plug assemblies and retain the same in the position in the member openings to which actuated, a plurality of plungers corresponding in number to the plug assemblies normally offset with respect to the axes of the plug assemblies and member openings, a plunger support, cam means in engagement with said plunger support operable to position said plungers simultaneously with their axes coincident with the axes of said plug assemblies, a member movable with the cam means operable upon positioning of said plungers to actuate said sliding plate out of engagement with said plugs to release said gripping means, a second member in engagement with said plunger support movable with the cam means to initiate actuation of the plungers as a group in an axial direction to engage the plug assemblies and force the same axially into the open ends of said shells, control means associated with said shell support including a switch member actuatable by the shells and operable to prevent operation of the machine if the shells are not properly positioned on the shell support, means to actuate the plunger mechanism in a reverse direction to withdraw the plungers from the openings, and means interconnecting said plunger support and said ejector pins acting upon reverse actuation of the plunger mechanism to actuate said ejector pins in the corresponding axial direction to eject the shells from the shell support.

References Cited in the file of this patent

UNITED STATES PATENTS 2,140,746 Huyett ---------------- Dec. 20, 1938